United States Patent
Diab et al.

(10) Patent No.: US 9,060,036 B2
(45) Date of Patent: Jun. 16, 2015

(54) SOCIAL NETWORKING GROUPING HIERARCHY

(75) Inventors: Wael W. Diab, San Francisco, CA (US); James D. Bennett, Hroznetin (CZ); Yasantha N. Rajakarunanayake, San Ramon, CA (US); Marcus C. Kellerman, San Diego, CA (US)

(73) Assignee: Broadcom Corporation, Irvine, CA (US)

( * ) Notice: Subject to any disclaimer, the term of this patent is extended or adjusted under 35 U.S.C. 154(b) by 566 days.

(21) Appl. No.: 13/436,557

(22) Filed: Mar. 30, 2012

(65) Prior Publication Data
US 2013/0091211 A1    Apr. 11, 2013

Related U.S. Application Data

(63) Continuation-in-part of application No. 13/342,301, filed on Jan. 3, 2012, which is a continuation-in-part of application No. 13/408,986, filed on Feb. 29, 2012, which is a continuation-in-part of application No. 13/351,822, filed on Jan. 17, 2012.

(60) Provisional application No. 61/545,147, filed on Oct. 8, 2011.

(51) Int. Cl.
*G06F 15/173* (2006.01)
*H04L 29/08* (2006.01)
*G06Q 50/00* (2012.01)

(52) U.S. Cl.
CPC .............. *H04L 67/306* (2013.01); *G06Q 50/01* (2013.01); *H04L 67/303* (2013.01)

(58) Field of Classification Search
CPC ....................................................... G06F 15/16

USPC ........................... 709/204, 224, 245; 715/738
See application file for complete search history.

(56) References Cited

U.S. PATENT DOCUMENTS 8,308,567 B2 * 11/2012 Blackburn et al. .............. 463/42
2002/0083148 A1 * 6/2002 Shaw et al. .................... 709/214

(Continued)

FOREIGN PATENT DOCUMENTS

CN              102196014 A        9/2011

OTHER PUBLICATIONS

European Patent Office; European Search Report; EP Application No. 12006973.7; May 10, 2013; 3 pgs.
European Patent Office; European Search Report; EP Application No. 12006969.5; Apr. 3, 2013; 3 pgs.

*Primary Examiner* — Michael Y Won
(74) *Attorney, Agent, or Firm* — Garlick & Markison; Edward J. Marshall

(57) ABSTRACT

A social networking environment enables interaction between social networking (SNET) groups. Some interactions between SNET groups can include docking various SNET groups based upon interactions between a member and some part of a social network. Various hierarchies of social networking infrastructure can enable hierarchical interactions between social devices, SNET groups, and other elements associated with various social networking infrastructures. Capabilities provided by various elements in various SNET infrastructures can be docked to create combined SNET groups, and capabilities provided by an SNET group can be accessed via interaction with a representative view of the capabilities. Various interactions can be managed based upon inputs, trigger events, authorizations, and the like provided by various processing systems, devices, members, or the like. Various interactions can enable members associated with an SNET infrastructure to access capabilities provided by an SNET group via a docked SNET group.

20 Claims, 17 Drawing Sheets

(56) References Cited

U.S. PATENT DOCUMENTS

| | | | |
|---|---|---|---|
| 2008/0222308 A1* | 9/2008 | Abhyanker | 709/245 |
| 2009/0307345 A1 | 12/2009 | Carter et al. | |
| 2010/0169789 A1* | 7/2010 | Cheng et al. | 715/738 |
| 2011/0153740 A1* | 6/2011 | Smith et al. | 709/204 |

* cited by examiner

Social Networking Grouping Hierarchy 100

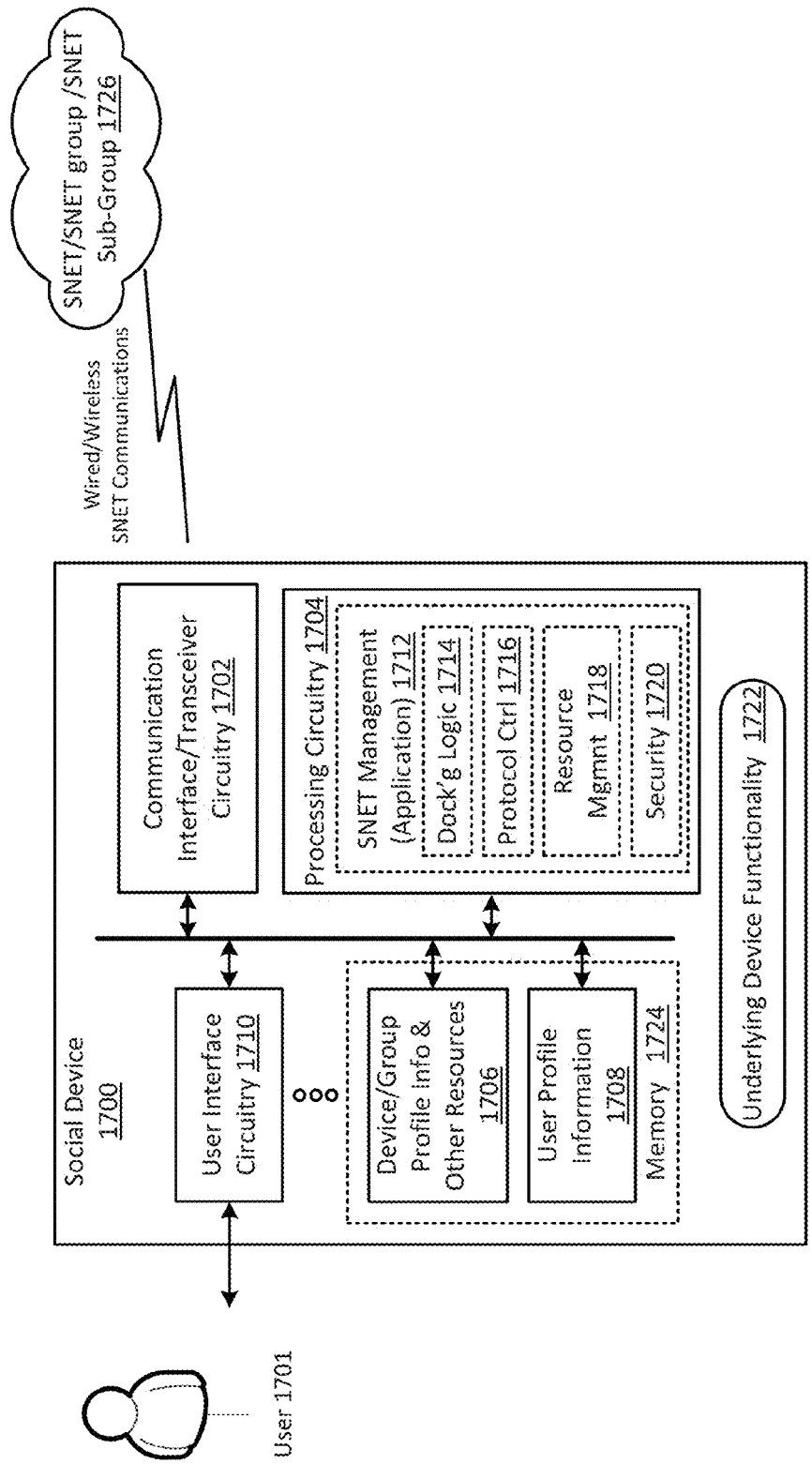

SOCIAL NETWORKING GROUPING HIERARCHY

CROSS REFERENCE TO RELATED PATENTS/PATENT APPLICATIONS

Provisional Priority Claim

The present U.S. Utility patent application claims priority pursuant to 35 U.S.C. §119(e) to the following U.S. Provisional patent application which is hereby incorporated herein by reference in its entirety and made part of the present U.S. Utility patent application for all purposes:
1. U.S. Provisional Patent Application Ser. No. 61/545,147, entitled "Social Network Device Memberships and Resource Allocation," filed Oct. 8, 2011, pending.

Continuation-in-part (CIP) Priority Claim, 35 U.S.C. §120

The present U.S. Utility patent application claims priority pursuant to 35 U.S.C. §120, as a continuation-in-part (CIP), to the following U.S. Utility patent application which is hereby incorporated herein by reference in its entirety and made part of the present U.S. Utility patent application for all purposes:
1. U.S. Utility patent application Ser. No. 13/342,301, entitled "Social Network Device memberships and Applications," filed Jan. 3, 2012, pending, which claims priority pursuant to 35 U.S.C. §119(e) to the following U.S. Provisional patent application which is hereby incorporated herein by reference in its entirety and made part of the present U.S. Utility patent application for all purposes: U.S. Provisional Patent Application Ser. No. 61/545,147, entitled "Social Network Device Memberships and Resource Allocation," filed Oct. 8, 2011, pending.
2. U.S. Utility patent application Ser. No. 13/408,986, entitled "Social Device Resource Management," filed Feb. 29, 2012, pending, which claims priority pursuant to 35 U.S.C. §119(e) to the following U.S. Provisional patent application which is hereby incorporated herein by reference in its entirety and made part of the present U.S. Utility patent application for all purposes: U.S. Provisional Patent Application Ser. No. 61/545,147, entitled "Social Network Device Memberships and Resource Allocation," filed Oct. 8, 2011, pending.
3. U.S. Utility patent application Ser. No. 13/351,822, entitled "Ad Hoc Social Networking," filed Jan. 17, 2012, pending, which claims priority pursuant to 35 U.S.C. §119(e) to the following U.S. Provisional patent application which is hereby incorporated herein by reference in its entirety and made part of the present U.S. Utility patent application for all purposes: U.S. Provisional Patent Application Ser. No. 61/545,147, entitled "Social Network Device Memberships and Resource Allocation," filed Oct. 8, 2011, pending.

FEDERALLY SPONSORED RESEARCH OR DEVELOPMENT

Not Applicable

MICROFICHE/COPYRIGHT REFERENCE

Not Applicable

BACKGROUND OF THE INVENTION

1. Field of the Invention

This invention relates generally to social networking, and more particularly to social network group access, interaction, communication, control, and related services and communications.

2. Related Art

The popularity and growth of social network sites and services has increased dramatically over the last few years. Present social network sites include Facebook, Google+, Twitter, MySpace, YouTube, LinkedIn, Flicker, Jaiku, MYUBO, Bebo and the like. Such social networking (SNET) sites are typically web-based and organized around user profiles and/or collections of content accessible by members of the network. Membership in such social networks is comprised of individuals, or groupings of individuals, who are generally represented by profile pages and permitted to interact as determined by the social networking service.

In many popular social networks, especially profile-focused social networks, activity centers on web pages or social spaces that enable members to view profiles, communicate and share activities, interests, opinions, status updates, audio/video content, etc., across networks of contacts. Social networking services might also allow members to track certain activities of other members of the social network, collaborate, locate and connect with existing friends, former acquaintances and colleagues, and establish new connections with other members.

Individual members typically connect to social networking services through existing web-based platforms via a computing device, tablet or smartphone. Members often share a common bond, social status, or geographic or cultural connection with their respective contacts. Smartphone and games-based mobile social networking services are examples of rapidly developing areas.

In so-called "cloud" computing, computing tasks are performed on remote computers/servers which are typically accessed via Internet connections. One benefit of cloud computing is that may reduce the relative processing and storage capabilities required by user devices (e.g., a cloud computer may load a webpage accessed by a tablet device and communicate only required information back to the tablet). Accordingly, recent years have witnessed an ever-growing amount of content and application software being migrated from local or on-site storage to cloud-based data storage and management. Such software functionality/services and content are typically available on-demand via (virtualized) network infrastructures.

In so-called "cloud" computing, computing tasks are performed on remote computers/servers which are typically accessed via Internet connections. One benefit of cloud computing is that may reduce the relative processing and storage capabilities required by user devices (e.g., a cloud computer may load a webpage accessed by a tablet device and communicate only required information back to the tablet). Accordingly, recent years have witnessed an ever-growing amount of content and application software being migrated from local or on-site storage to cloud-based data storage and management. Such software functionality/services and content are typically available on-demand via (virtualized) network infrastructures.

Often, a visitor to a location, network, or the like is granted access to a location, business network, and possibly to a social networking environment, cloud applications, or cloud media content. Such grants are often virtually unlimited in duration and scope. In addition, a social group has a variety of mechanisms for establishing contact with another member, member device, or member device service, including, for example, telephone numbers, IP or other routing addresses, VoIP/video call handles, twitter handles, other SNET handles, blogs, web page addresses, email addresses, etc. When a change to the above occurs, it may be difficult to convey the information to all other members and member devices.

BRIEF DESCRIPTION OF THE DRAWINGS

FIG. 17 illustrates a social device comprising integral functionality operable to support social network group/sub-group membership and communications according to various embodiments of the disclosure.

DETAILED DESCRIPTION OF THE INVENTION

As used herein, the terms "social network", "SNET", "social networking system", "social networking infrastructure", and the like, comprise a grouping or social structure of devices and/or individuals, as well as connections, links and interdependencies between such devices and/or individuals. Members or actors (including devices) within or affiliated with an SNET may be referred to herein as "members", "users", "membership", "nodes", "social devices", "SNET members", "SNET membership", "SNET devices", "user devices" and/or "modules". In addition, the terms "social circle", "social group", "SNET circle", "SNET sub-circle", "SNET group", and "SNET sub-group" generally denote an SNET that comprises SNET devices and, as contextually appropriate, human SNET members, device SNET members, personal area networks ("PAN"), and the like.

Figure 1:
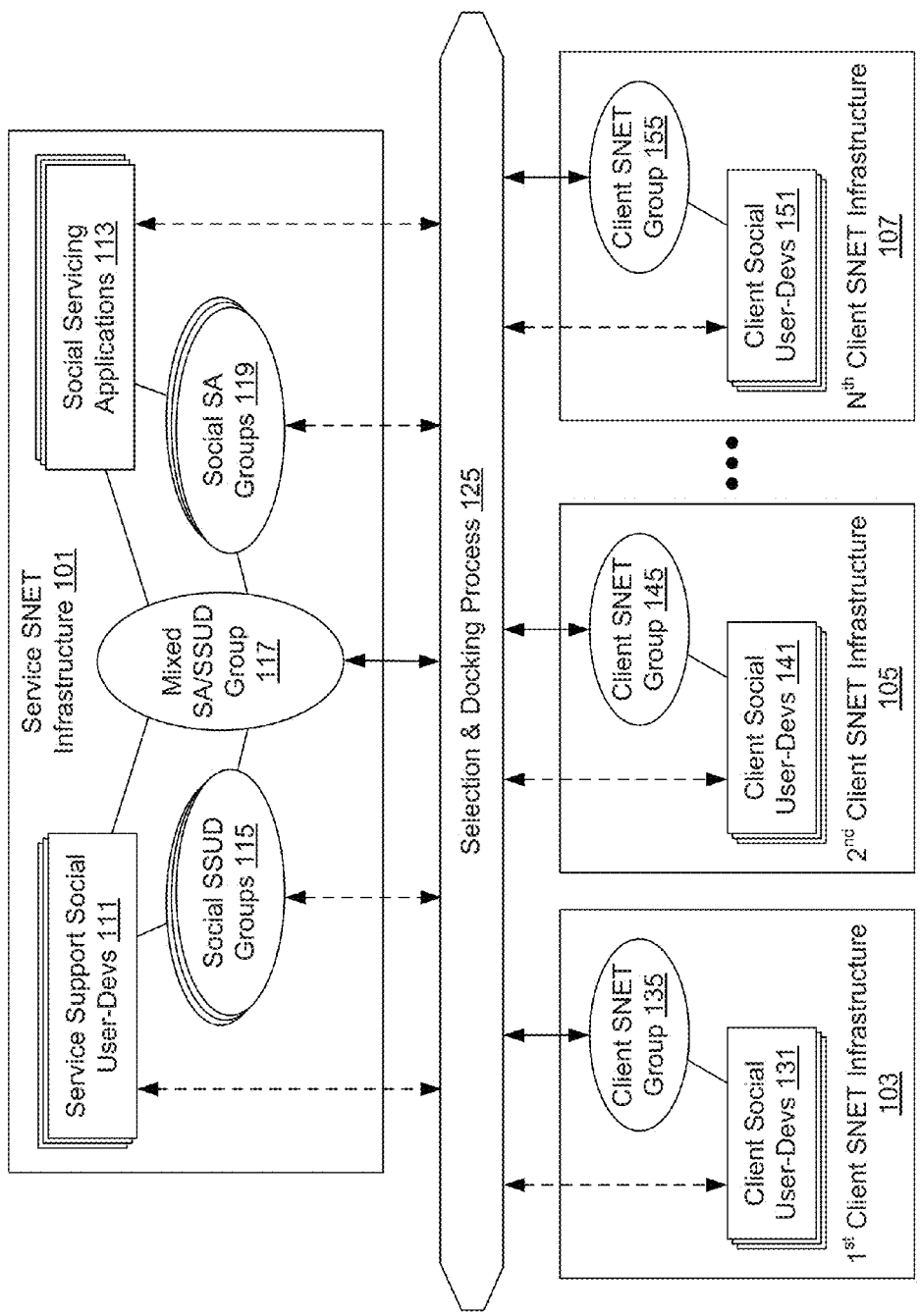
FIG. 1 illustrates a schematic block diagram of a social networking grouping hierarchy according to various embodiments of the disclosure.

Referring now to FIG. 1, a social networking (hereinafter "SNET") grouping hierarchy 100 according to various embodiments is shown. In some embodiments, a SNET grouping hierarchy 100 includes one or more tiers of SNET infrastructure, encompassed at least in part by an SNET, that can be docked to (hereinafter referred to interchangeably as "associated with", "joined", and the like) other SNET infrastructure, SNET groups, social devices, and the like. For example, in the illustrated embodiment, one tier of SNET grouping hierarchy 100 can include a service SNET infrastructure 101, and another tier of SNET grouping hierarchy 100 can include one or more client SNET infrastructures 103, 105, and 107. In some embodiments, various tiers can be docked such that a "higher" tier can be docked to "lower" tiers to provide access by "lower" tiers to various capabilities provided by the "higher" tier.

In some embodiments, one or more infrastructures are managed by one or more processing systems, computers, server devices, network nodes, social devices, some combination thereof, or the like. For example, in the illustrated embodiment, some or all of the service SNET infrastructure 101, one or more client SNET infrastructures 103, 105, and 107, some combination thereof, and the like, may be managed by one or more social service support devices 111, one or more client social devices 131, 141, and 151, some combination thereof, or the like. Processing systems can include, without limitation, one or more instances of processing circuitry distributed across one or more server devices, network nodes, some combination thereof, or the like.

For example, in the illustrated embodiment, SNET grouping hierarchy 100 includes a service SNET infrastructure 101 in a first tier, and multiple client SNET infrastructures 103, 105, and 107 in a second tier. Infrastructures can include, without limitation, one or more SNET groups, one or more services, applications, resources, devices, and the like associated with one or more entities, which can include, without limitation, clients, members of an SNET, nonmembers of an SNET, guests of an SNET, some combination thereof, and the like. For example, service SNET infrastructure 101 can include, without limitation, user devices 111, applications 113, and SNET groups 115, 117, and 119 associated with one or more services. A client SNET infrastructure 103 can include one or more client SNET groups 135 and one or more social devices 131 associated with one or more particular clients (hereinafter referred to interchangeably as users, members, visitors, guests, and the like). For example, a first client-side infrastructure 103 can include one or more SNET groups 135 associated with an SNET member, along with one or more social devices 131 associated with the SNET member. As shown in the illustrated embodiment, the social devices 131 in a client infrastructure 103 can be docked, associated, joined, and the like with SNET groups associated with the client. At least one process of docking is discussed in further detail in at least U.S. Utility patent application Ser. No. 13/408,986, entitled "Social Device Resource Management," filed Feb. 29, 2012, incorporated by reference herein in full for all purposes. In some embodiments, a device, SNET group, or the like docked to another SNET group becomes a member of the SNET group to which it is docked. By docking a client social device 131 to a client SNET group 135, a user associated with a client SNET group 135 can interact with the SNET group 135 by interacting with a social device 131 docked to the SNET group 135. Members, clients, users, and the like, as referred to herein, can include, without limitation, human members of an SNET or some other network, device members of an SNET or some other network, some combination thereof, and the like.

In some embodiments, one or more capabilities, which can include, without limitation, various services, applications, SNET groups, some combination thereof, and the like are mixed, combined, merged, some combination thereof, and the like, via a docking process, into one or more SNET groups that can provide access to a desired selection of capabilities through interaction with the one or more SNET groups. For example, service SNET infrastructure 101 illustrates capabilities that can be provided by various service support social user devices 111, various social servicing applications 113, and the like. In some embodiments, access to various service support social user devices 111, either directly, through interaction with a SNET group 115 to which the service support social user devices 111 are docked, and access to various social servicing applications 113, either directly, through interaction with a SNET group 119 docked to the social servicing applications 113, or the like can be provided to SNET members. One or more of the capabilities provided by the devices 111 and applications 113, SNET groups 115 and 119 docked to the devices 111 and applications 113, some combination thereof, or the like can be combined into a single SNET group that can provide access to one or more capabilities provided by devices, services, applications, SNET groups, some combination thereof, or the like.

For example, a user of a client SNET infrastructure 103 can, by docking a social device 131, via a docking process 125, to a single SNET group 117 that itself combines SNET groups 115 and 119, gain access to the capabilities provided by both SNET groups 115 and 119 by docking with SNET group 117.

In some embodiments, access to capabilities provided by one or more SNET groups, infrastructures, and the like can be accomplished by docking one SNET group to another SNET group. For example, a client SNET group 135 can be docked, via a docking process 125, to SNET group 117, thereby enabling a user of the client-side infrastructure 103 to access the capabilities provided by SNET group 117 through the client SNET group 135. In particular, where one or more social devices 131 are docked to the client SNET group 135, a user can access the capabilities provided by SNET group 117 via one or more of the social devices 131 that are docked with the client SNET group 135. A docking process 125 can include joining client SNET group 135 as a member of SNET group 117, docking (also referred to herein as "associating") client SNET group 135 to SNET group 117 via one of various processes described herein and in at least U.S. Utility patent application Ser. No. 13/342,301, entitled "Social Network Device memberships and Applications," filed Jan. 3, 2012, U.S. Utility patent application Ser. No. 13/408,986, entitled "Social Device Resource Management," filed Feb. 29, 2012, incorporated by reference herein in full for all purposes, some combination thereof, or the like.

As an illustration of the above embodiment, a user entering premises including, without limitation, a store, restaurant, hotel, business, public area, and the like may desire to access capabilities including, without limitation, services, applications, information, devices, some combination thereof, and the like provided by an SNET group associated with the premises. Rather than individually dock each of the user's devices with the SNET group, the user can simply dock a personal SNET group, to which the user's devices are docked, with the SNET group associated with the premises, thereby granting the user access to the premises' capabilities through some or all of the devices that the user has docked with his personal SNET group. As a further example, a hotel may provide various capabilities including, without limitation, access to a call routing phone service, control of a particular television device, access to a database, some combination thereof, or the like through an SNET group. Rather than individually dock his personal devices to the hotel's SNET group to utilize the capabilities provided, including, without limitation, docking a smartphone device to the hotel SNET group to utilize the call routing phone service, docking a computer device to the hotel SNET group to control the particular television device, or the like, the guest can simply dock his personal SNET group to the hotel's SNET group and then access the capabilities provided through the hotel's SNET group through a device docked with his personal SNET group.

In some embodiments, docking SNET groups such that a user, member, client, or the like can access capabilities provided by various services, devices, SNET groups, and the like associated with various SNET infrastructures enhances security. For example, where a user associated with a first client SNET infrastructure 103 can only access capabilities provided by service SNET infrastructure 101 by docking with SNET group 117, various levels of security can be utilized by one or more processing systems, devices, and the like associated with the service SNET infrastructure 101, client SNET infrastructure 103, and the like to ensure secure access to the capabilities. In addition, in some embodiments, accessing capabilities provided by an SNET infrastructure by docking two or more SNET groups provides additional levels of security. For example, where access to capabilities provided by service SNET infrastructure 101 entails docking a client SNET group 135, 145, 155, or the like to SNET group 117, a more secure connection, with various levels of security, can be employed, and access to the capabilities can be easily granted, altered, restricted, terminated, and the like via management of a single dock, association, or the like between a client SNET group and SNET group 117. A processing system, device, or the like associated with the service SNET infrastructure 101, client SNET infrastructure 103, or the like can manage the association based upon inputs received from a user, a third-party entity, some internal logic, elapse of a period of time, a change in geographic location of a client social device 131 associated with the client SNET infrastructure 103, some other trigger event, some combination thereof, or the like.

In some embodiments, the selection and docking process 125 can be automated, automatic, some combination thereof, or the like. For example, a docking process may be automatic by being triggered based upon a location of a user of an infrastructure, including, without limitation, a geographic proximity of one or more of a user, a social device 131 associated with a user, a social device 131 docked with a particular client SNET group 135, some combination thereof, or the like. In some embodiments, a user can provide one or more association rules that can provide conditions under which one or more particular client SNET groups 135 can be docked to other SNET groups. Conditions can include, without limitation, geographic proximity of one or more social devices 131 docked to the particular client social 135 to a geographic location associated with an SNET group 117, authorization by a user associated with the infrastructure 103, SNET group 135, social device 131, some combination thereof, or the like to dock the client SNET group 135 with SNET group 117, some combination thereof, or the like. Association rules can be communicated to a social device 131 docked with a particular SNET group 135, a processing system that manages docking of various SNET groups, some combination thereof, or the like. One or more of a processing system, a social device 131, some combination thereof, or the like can monitor a client SNET group 135, social device 131 docked to the client SNET group 135, one or more attributes of another one or more SNET groups 117 in relation to one or more attributes of one or more client SNET groups 135, docked social devices 131, some combination thereof, or the like in relation to one or more association rules in order to determine whether to dock one or more SNET groups, social devices, or the like together. Association rules can be altered by a user, a processing system, some other entity, or the like, on the fly to create new rules, delete rules, alter rules, or the like. For example, a user associated with a client SNET group 135, who may have previously communicated to a processing system an association rule that prohibits docking the client SNET group 135 to an SNET group 117 beyond a threshold geographic proximity to a social device 131, can communicate, on the fly, an alteration of the association rule that can include, without limitation, altering the threshold geographic proximity, authorizing a docking of the client SNET group 135 to a particular SNET group 117 on a case-by-case basis, ordering an undocking of a client SNET group 135 from another SNET group, some combination thereof, or the like.

In some embodiments, various tiers of a SNET grouping hierarchy 100 are subject to various levels of access to information. For example, in the illustrated embodiment, a user of the "higher-tier" service SNET infrastructure 101 may be able to view each client SNET group 135, 145, and 155 associated with a "lower-tier" client SNET infrastructure 103, 105, and 107 that is docked to an SNET group 117 associated with the social service infrastructure 101. A user of the service SNET infrastructure 101 may also be able to view the various social devices 131, 141, and 151 docked to the various client SNET groups 135, 145, and 155. In another example, one or more users of a "lower-tier" infrastructure including, without limitation, client SNET infrastructure 103, 105, and 107 may be able to view some or all of the capabilities provided through an SNET group associated with a "higher-tier" infrastructure to which an SNET group associated with the "lower-tier" infrastructure is docked, but cannot view some or all of the "higher-tier" infrastructure, including, without limitation, various SNET groups 115 and 119 from which capabilities provided by SNET group 117 are originally provided. Additionally, a user of a "lower-tier" infrastructure accessing an SNET group 117 associated with a "higher-tier" service SNET infrastructure 101 may be unable to view some or all of the other similarly "lower-tier" client SNET infrastructures 105 and 107 that are also docked with the same SNET group 117.

In some embodiments, the selection and docking process 125 can be controlled, managed, and the like by one or more various social devices, processing systems, or the like. For example, a processing system of a SNET infrastructure, which can include one or more instances of processing circuitry distributed across one or more server devices, network nodes, some combination thereof, or the like, may control the docking and undocking of one SNET group to another, based upon a user's interaction with the SNET, one or more association rules, one or more inputs, some internal logic, some combination thereof, or the like. As another example, a social device may control the docking and undocking of one or more SNET groups based upon a user's interaction with the SNET, one or more association rules, one or more inputs, some internal logic, some combination thereof, or the like. In some embodiments, a processing system, social device, some combination thereof, or the like authorized to manage a "higher tier" infrastructure can manage one or more attributes of access by one or more "lower-tier" infrastructures docked to the "higher-tier" infrastructure. For example, a processing system authorized to control a "higher-tier" social service infrastructure 101 may alter access to certain capabilities, restrict access to certain capabilities, terminate access via undocking of SNET groups and devices, some combination thereof, or the like based upon input, or some other logic. The processing system may determine that a trigger event including, without limitation, all social devices 131 docked with a client SNET group 135 docked to SNET group 117 have exceeded a predetermined threshold geographic proximity distance from a geographic location associated with SNET group 117 and, based upon the determination, undock the client SNET group 135 from SNET group 117, partially or fully restrict access by client SNET group 135 to certain capabilities provided by SNET group 117, some combination thereof, or the like.

Figure 2:
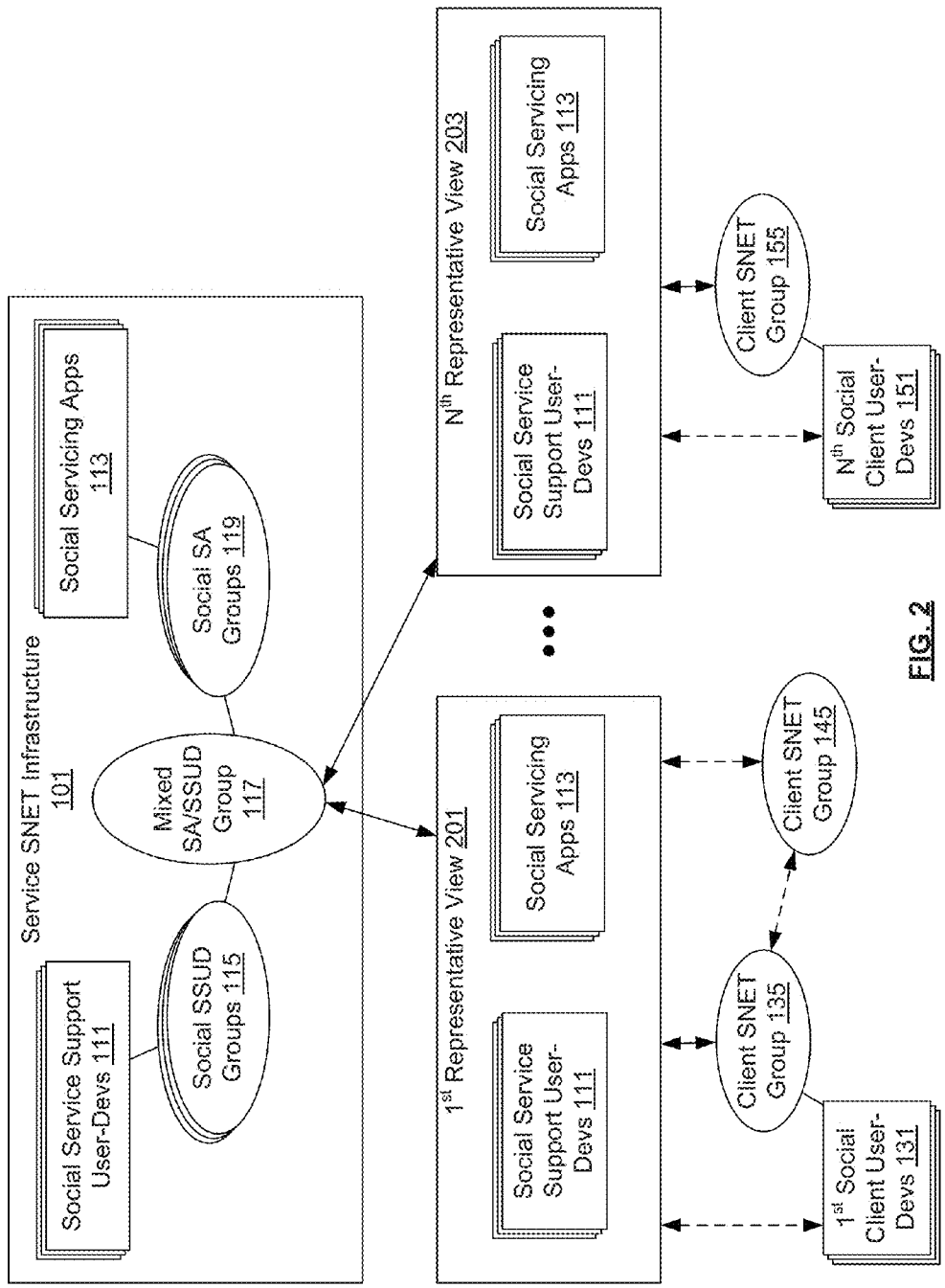
FIG. 2 illustrates a schematic block diagram of representative views according to various embodiments of the disclosure.

Referring now to FIG. 2, various representative views according to various embodiments are discussed. In some embodiments, a user, SNET member, SNET nonmember, and the like associated with a first infrastructure that is docked with a second infrastructure, via one or more docked SNET groups, social devices, some combination thereof, or the like, can access capabilities provided by the second infrastructure by interacting with a representative view, which can be part of data provided by a processing system, some part of the second infrastructure, some part of the first infrastructure, a social device associated with the first infrastructure, a second device associated with the user, some combination thereof, or the like. For example, where a client SNET group 135 of the first social client-side infrastructure 103, illustrated above in FIG. 1, is docked with an SNET group 117 of the social service infrastructure 101 that provides device access capabilities 111 and 113 provided by SNET groups 115 and 119, a user may access capabilities provided by SNET group 117 via interaction with a representative view 201 that is part of data provided by one or more SNET systems, SNET, SNET infrastructure, SNET group, SNET device, some combination thereof, or the like. Where a client SNET group 135 is docked with one or more client social devices 131, a user may interact with some part of one or more social devices 131 to access capabilities provided by SNET group 117 via the client SNET group 135, directly via the social devices 131, some combination thereof, or the like.

In some embodiments, a representative view can provide a simplified representation of the capabilities that can be accessed via a docking of one or more SNET groups. For example, while SNET group 117 provides capabilities 111 and 113 by merging the SNET groups 115 and 119 that provide the capabilities 111 and 113, a representative view 201 provided to a member accessing SNET group 117 via a docked client SNET group 135, a social device 131 docked to a docked client SNET group 135, some combination thereof, or the like, may display only the capabilities provided by SNET group 117 with little or no indication of the true complexity of the groups 115 and 119 that are combined to enable SNET group 117 to provide capabilities 111 and 113. A member accessing the capabilities 111 and 113 via a representative view 201 may access the capabilities 111 and 113 by interacting with representations of those capabilities included in representative view 201 that is part of data provided by one or more SNETs, SNET systems, SNET infrastructures, processing systems, devices, SNET groups, some combination thereof, or the like. Interaction with the representative view 201 can, in some embodiments, proceed via interaction with some part of a docked social device 131 including, without limitation, a user interface, a part of a docked client SNET group 135, some combination thereof, or the like.

In some embodiments, one or more third-party SNET groups associated with separate members, infrastructures, and the like are docked with a first SNET group to enable members of the third-party SNET group to access some or all of information associated with the first SNET group, capabilities provided by a docked SNET group, some combination thereof, or the like. For example, in the illustrated embodiment, client SNET group 145 can be docked to client SNET group 135, thereby enabling client SNET group 145 to access some or all of information provided to members of client SNET group 135, capabilities provided by SNET group 117 that is docked to client SNET group 135, some combination thereof, or the like.

As an example of the above, a traveler may desire to dock a client SNET group 145 associated with his company to a personal client SNET group 135 associated with his business travels. By docking the company's client SNET group 145, the traveler may enable members of the company's client SNET group 145 to view the traveler's whereabouts as they are provided to members of his personal client SNET group 135, access at least some of the capabilities provided to the traveler by docking with other SNET groups via the same or a similar representative view 201 (e.g., access and manage his travel reservations, provide relevant travel and business update information to the traveler on the fly, etc.), some combination thereof, and the like. Such dockings can be managed by the traveler's social device 131, by the social service infrastructure 101 based upon input provided by the traveler, by one or more other devices, some combination thereof, or the like. For example, the traveler may authorize only limited access by docked third-party SNET groups 145 to information associated with his personal client SNET group 135, limited access to capabilities provided by a docked SNET group 117, and the like, and the traveler may authorize access restrictions, undocking, some combination thereof, and the like based upon on-the-fly input, one or more trigger events, or the like. Trigger events can include, without limitation, a change in geographic location associated with one or more social devices 131 associated with the traveler, a change in authorization information provided by an entity, or the like.

In some embodiments, distinct representative views can be provided where separate SNET groups, SNET devices, and the like associated with a "lower-tiered" infrastructure are docked to a "higher-tiered" infrastructure in an SNET grouping hierarchy. In the illustrated embodiment, for example, client SNET group 135 and client SNET group 155, which are associated with a first social client-side infrastructure 103 and an Nth social client-side infrastructure 105, respectively, are each docked to SNET group 117 associated with social service infrastructure 101. In the illustrated embodiment, a first representative view 201 is provided to a member accessing the capabilities of SNET group 117 through the client SNET group 135, a docked social device 131, some combination thereof, or the like, and an nth representative view 203 is provided to a member accessing the capabilities of SNET group 117 through client SNET group 155, a docked social device 151, some combination thereof, or the like. In some embodiments, representative views provided to separate docked SNET groups are distinct, separate, or the like with respect to each other. For example, in an embodiment where SNET group 117 provides capabilities associated with a hotel experience, including, without limitation, remote control of a television device, and docked client SNET groups 135, 155, and the like are associated with separate hotel guests, the capabilities provided via one or more separate representative views can be distinct such that the hotel guest can access capabilities customized to the guest including, without limitation, remote control of a specific television device associated with a hotel room. Where the guest is not an SNET member, the guest can be invited to create a temporary SNET group, guest SNET group, an ad hoc SNET group, some combination thereof, or the like, and then dock the created SNET group to another SNET group to access capabilities provided by the other SNET group.

Figure 3:
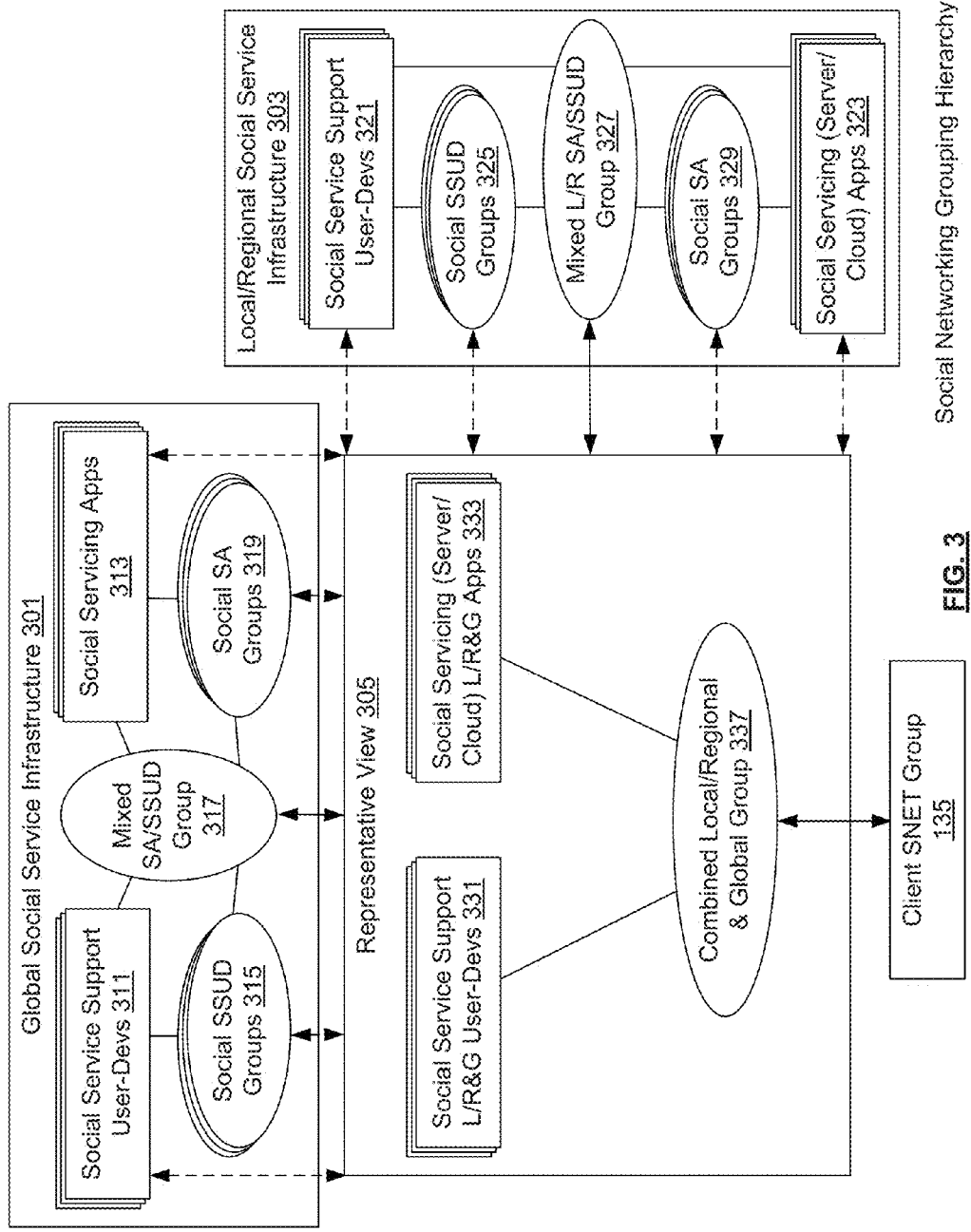
FIG. 3 illustrates a schematic block diagram of a social networking grouping hierarchy according to various embodiments of the disclosure.

Referring now to FIG. 3, some embodiments of an SNET grouping hierarchy 300 can enable a client SNET group 135 to dock to an SNET group that provides capabilities from various infrastructures. In the illustrated embodiment, two infrastructures 301 and 303 are combined, docked, associated, or the like to provide capabilities from both infrastructures 301 and 301 through a single combined SNET group 337. The global social service infrastructure 301 includes capabilities provided by social service support user devices 311, social servicing apps 313, and various SNET groups 315, 319, and 317 that provide some combination of the capabilities provided by the infrastructure 301. In addition, the local/regional social service infrastructure 303 also includes capabilities provided by social service support user devices 321, social servicing apps 323, and various SNET groups 325, 329, and 327 that provide some combination of the capabilities provided by the infrastructure 303. The combined local/regional and global SNET group 337 provides a combination of the capabilities provided by the social service support user devices 311 and 321 and the social servicing apps 313 and 323 provided by both infrastructures 301 and 303. Where client SNET group 135 can be docked with SNET group 337, a member of client SNET group 135 will be able to access the capabilities provided by both infrastructures by docking a single client SNET group with a single SNET group 337.

In some embodiments, a representative view 305 provided to a member of client SNET group 135 accessing the capabilities provided by SNET group 337 includes only the combined capabilities provided by both infrastructures 301 and 303 independently of some or all indications of the infrastructure from which some or all of the capabilities are originally provided. In the illustrated embodiment, for example, the capabilities provided by the social service support user devices 331 and 321 from both infrastructures 301 and 303 are presented in the representative view 305 as a combined set of social service support user devices 331; likewise, the social servicing apps 313 and 323 from both infrastructures 301 and 303 are presented in the representative view 305 as a combined set of social servicing apps 333. In addition, all of the SNET groups 315, 317, 319, 325, 327, and 329 in the infrastructures that are partially or fully combined into SNET group 337 may be partially or fully transparent to a member accessing a representative view 305 of the capabilities provided by SNET group 337. In some embodiments, a member accessing representative view 305 can restore the full complexity of the combination of infrastructures 301 and 303 in representative view 305, such that the member can view the various SNET groups and capabilities specific to various infrastructures and provided capabilities.

As an example of the illustrated embodiment, a hotel chain may provide a global SNET infrastructure 301 that provides capabilities common to all hotels in the franchise, such as a global media database, corporate contact information, information databases, some combination thereof, or the like. In addition, a certain local hotel may desire to have a local SNET infrastructure 303 that provides access to local entertainment, dining, news information, device access specific to the local hotel, some combination thereof, and the like. The hotel may desire to combine the hotel chain's capabilities provided by the global SNET infrastructure 301 with the location-specific capabilities provided by the local SNET infrastructure into a combined SNET group 337, to enable a hotel guest to access global and local capabilities with a single docking process and via a single representative 305 that provides global and local capabilities partially or fully combined.

In some embodiments, combinations of capabilities provided by separate infrastructures are managed, in part or in full, by one or more processing systems, social devices, members, applications, some combination thereof, or the like that are associated with one or more infrastructures. For example, in the illustrated embodiment, a processing system associated with the local SNET infrastructure 303 may manage the combination of capabilities from infrastructures 301 and 303 into SNET group 337, manage docking of client SNET groups 135 with the SNET group 337, some combination thereof, or the like.

In some embodiments, access to an SNET group 337 by a client SNET group 135 can be granted, restricted, terminated, or the like by a network manager, processing system, social device, some combination thereof, or the like, according to an input, a trigger event, some other internal logic, or the like. For example, when a social device docked with a client social device 135 leaves a premises associated with an SNET group 337, the client SNET group's 135 access to capabilities provided by SNET group 337 may be terminated by terminating or restricting access granted by the docking, changing authorization to interact with some or all capabilities provided by SNET group 337, undocking the client social device 135 from SNET group 337, some combination thereof, or the like. This can occur automatically, in response to a trigger event, including, without limitation, elapse of a predetermined time after entering or leaving the premises, or the like. In some embodiments, a client SNET group 135 can maintain residual access to SNET group 337 after a device docked to the client SNET group 135 leaves the premises. For example, where the premises associated with SNET group 337 is a hotel, and a member associated with client SNET group 135 belongs to an exclusive hotel membership, the client SNET group 135 associated with the member may, after a docked device leaves the premises, still receive at least some access to capabilities provided by SNET group 337, including, without limitation, a call routing phone service.

In some embodiments, an SNET group associated with a member, including a human, a device, or the like, can be docked to another SNET group to enable the member to access or receive services, contact information, other information associated with the SNET group, exchange information, some combination thereof, or the like. Such a member can be an existing member of an SNET, a nonmember, also referred to herein as a third party, or the like. For example, a human user with a device can approach within a threshold, such as a proximity, of an access point for a premises, or the like, upon which the access point, some other device associated with the premises, or the like delivers an invitation to dock to an SNET group associated with the premises to the human user via the device, to the device itself, some combination thereof, or the like. The invitation can vary depending upon whether one or both the human user and the device are already members of the SNET, nonmembers, or the like. For example, where the device is not a social device, the access point can deliver an invitation in the form of a web page to the device via a browser application, or the like, that offers the device, human user, some combination thereof, or the like the option of joining an SNET group as an ad hoc member. Where the device is a social device, the invitation can include a direct invitation to dock an SNET group with the premises-associated SNET group via a social interface, user interface, or the like, located on the device.

The invitation can be accepted via one of various acceptance processes. For example, where a social device receives an invitation that includes a unique identifier uniquely identifying the SNET group to which the member is invited to dock an SNET group, social device, or the like, the social device can interact with an access point, another device, an SNET, SNET group, SNET sub-group, and the like via an independent pathway, or the like to utilize the unique identifier to accept the invitation. Acceptance in the above example may include simply delivering the unique identifier and information identifying the SNET group associated with delivery of the unique identifier, upon which the SNET group is docked to the premises-associated SNET group. In addition, where a non-social device attempts to access an access point, and the access point pushes a web page to a browser application on the non-social device, the acceptance process can include accessing the web page, indicating a desire to dock with the SNET group, providing some other information, or the like, such that the non-social device, an ad hoc guest SNET group, some combination thereof, or the like is accepted as docked to the premises-associated SNET group.

Upon accepting the invitation, the member, human user, device, some combination thereof, or the like can gain at least some access to capabilities provided by the premises-associated SNET group. For example, where the premises is a coffee shop, a member whose personal SNET group is docked to a premises-associated SNET group may gain access, via one or more devices docked to his personal SNET group, to various services including, without limitation, online newspapers, videos, a menu for item sales, shopping options for home delivery, ordering interface for on-site delivery, other information, some combination thereof, or the like. In another example, where the premises is a hotel, private residence, or the like, a member whose personal SNET group is docked to a premises-based SNET group may gain access, via one or more devices docked to his personal SNET group, to services, information, and the like including, without limitation, access to locally or remotely-stored content items, contact information, access to control functional elements of on-site devices, some combination thereof, or the like. In another example, where the premises is a shopping mall, an access point may deliver, push, or the like an invitation to the device, user of the device, some combination thereof, or the like to dock to an SNET group associated with the mall. The access point may require that a device, user, or the like attempt to access the access point before the invitation is delivered to the device, user, or the like in the form of a unique identifier, web page, or the like. Services associated with the SNET group can include, without limitation, advertising, sales and coupon information, and the like provided by computing devices of each store within the mall, a mall mapping service that show those docked to the SNET group the locations of particular stores, a mall music service that provides those docked to the SNET group with music or other media content served by media sources associated with the SNET group, telephone directory services, a search engine relating to anything within any store in the mall, some combination thereof, or the like.

In some embodiments, an access point supports delivery of invitations to dock to an SNET group, processing acceptances of invitations, routing communications between members, ad hoc members, and potential members of an SNET group and the SNET, SNET group, or the like. A device may need to attempt to access the access point to receive an invitation provided by the access point. In some embodiments, the access point automatically provides the invitation to any device that the access point determines has crossed a threshold, such as a predetermined proximity to a premises, location, or the like. Those docked to the SNET group, including ad hoc members, SNET groups, ad hoc SNET groups, some combination thereof, or the like, may be able to couple with other devices, users, members, or the like that are also docked with the SNET group. Upon crossing another or the same threshold, docking to the SNET group can be terminated or restricted. For example, where a device that enters a premises is offered an ad hoc docking to an SNET group by an access point, the access point may restrict, terminate, or the like the ad hoc docking upon determining that the device has left the premises.

Figure 4:
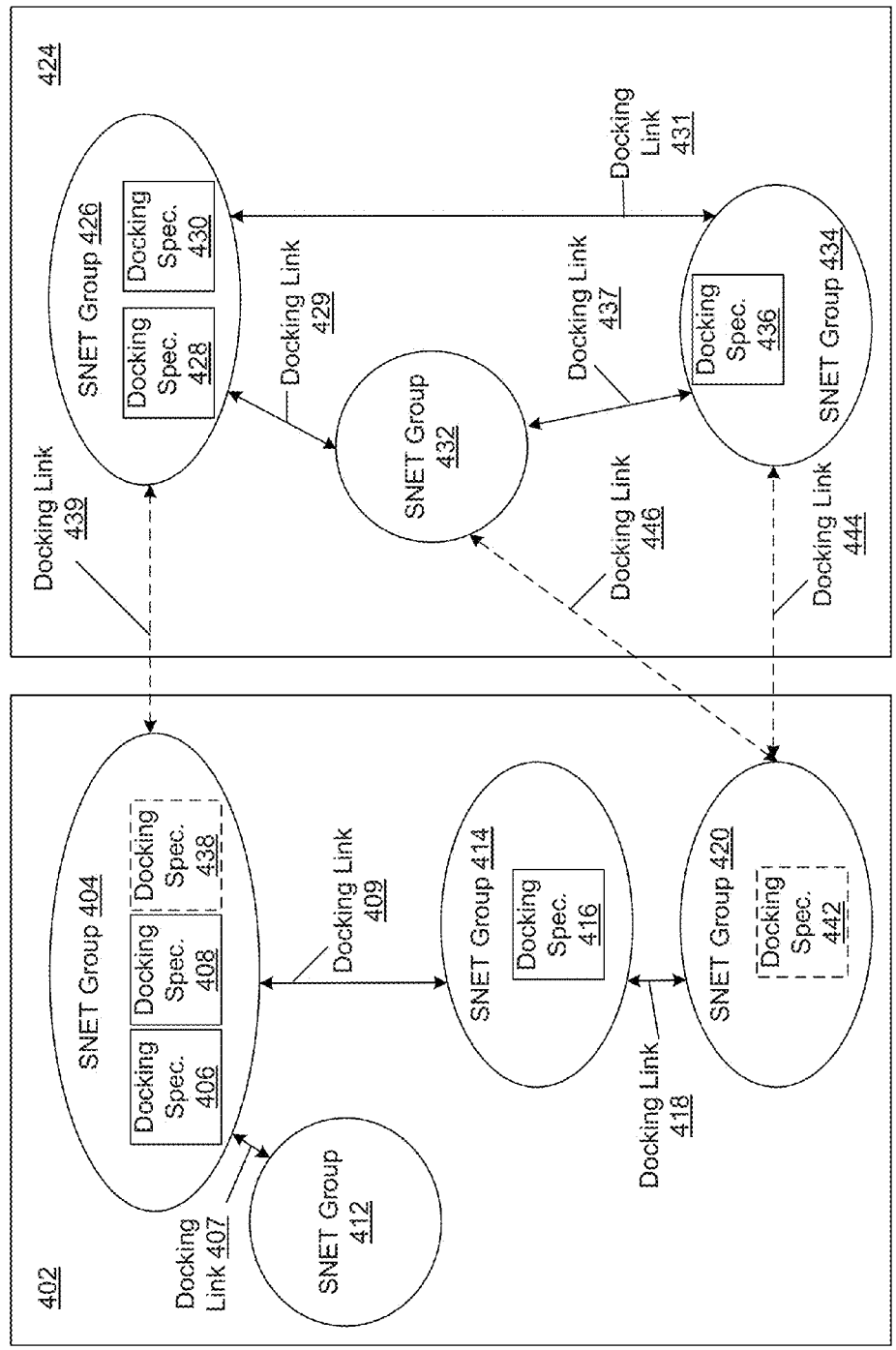
FIG. 4 illustrates a schematic block diagram according to various embodiments of the disclosure.

FIG. 4 illustrates interactions between various SNET system, infrastructures, groups, devices, and the like according to various embodiments. In the illustrated embodiment, an SNET infrastructure 402 which can be included in an SNET, SNET system, SNET infrastructure, some combination thereof, or the like, can include one or more various SNET groups, social devices, some combination thereof, or the like. For example, infrastructure 402 can represent an SNET infrastructure associated with an SNET, SNET group, processing system, SNET account, SNET member, human, device, social device, some combination thereof, or the like.

In some embodiments, various SNET groups are created by an SNET infrastructure based upon on an input from a user, member, processing system, device, SNET, SNET group, some combination thereof, or the like. For example, where SNET infrastructure 402 is associated with an SNET member account, a member of the account may provide input to the SNET infrastructure 402 to create SNET group 404. The input can include, without limitation, attributes of the group 404, social devices to be docked with the group 404, information to be accessible to one or more members of group 404, some combination thereof, or the like.

In some embodiments, an SNET group in an SNET infrastructure is docked with another SNET group. For example, in the illustrated embodiment, SNET group 404 is docked with SNET group 412 and SNET group 414 via docking links 407 and 409, respectively. Docking one SNET group to another SNET group can be accomplished via one or more various docking processes including, without limitation, sole initiation of docking by one or more devices, SNET groups, or the like.

In some embodiments, a docking process can include interactions between at least some of both a first SNET group and a second SNET group. For example, where SNET group 412 is to be docked to SNET group 404 via docking link 407, SNET group 412 and SNET group 404 may exchange security information processing, and the like with reference to one or more members, docked devices, functional elements, accessible information, some combination thereof, or the like between the two SNET groups. Such exchanges can enable additional security verifications of appropriate interactions and access between the two SNET groups, their respective members, and the like. In some embodiments, additional security processes, such as human confirmation requirements, are employed to ensure secure access to capabilities of one or more docked SNET groups, devices, members, and the like.

In some embodiments, a docking process can include various actions performed by one or more of an SNET, SNET system, SNET infrastructure, processing system, SNET group, social device, user, member, some combination thereof, or the like that can include, without limitation, verifying an optimal docking location, arranging a presentation of docking links to a user, member, or the like. For example, where a user associated with SNET infrastructure 402 interacts with SNET infrastructure 402 to dock SNET group 420 to some part of SNET infrastructure 424 to access various capabilities of SNET groups included in SNET infrastructure 424, a docking process to associate, dock, or the like SNET group 420 with another SNET group in SNET infrastructure 424 can include, without limitation, determining an optimal docking configuration between SNET group 420 and one or more various SNET groups in SNET infrastructure 424 to enable access by a member of SNET group 420 to certain one or more capabilities of SNET infrastructure 424. As shown in the illustrated embodiment, SNET group 420 can be docked with both SNET group 432, via docking link 446, and SNET group 434, via docking link 444, as part of a single docking process to associate SNET group 420 with certain capabilities provided by various SNET groups in SNET infrastructure 424, where the optimum docking configuration is determined to include, without limitation, docking SNET group to both SNET group 432 and SNET group 434 to access the capabilities. The docking links 446 and 444 can be governed by a single docking specification 442, some other combination of docking specifications that are part of SNET infrastructure 424, some combination thereof, or the like. In some embodiments, docking links and docking specifications can be docked, associated, or the like in one-to-one type relationships, one-to-many type relationships, many-to-one type relationships, some combination thereof, or the like.

In some embodiments, a docking process that associates SNET group 420 with certain capabilities of SNET infrastructure 424 via docking with both SNET group 432 and SNET group 434 may include arranging a presentation of the docking links so that a member accessing the capabilities does not see a full complexity of the docking links, interactions, and the like between various SNET groups, devices, SNET infrastructures, and the like. In the illustrated embodiment, for example, a docking process for docking SNET group 420 with SNET groups 432 and 434 may include arranging a presentation, representative view, or the like of the capabilities of SNET group 424 that can be accessed by a member of SNET group 420 to hide the fact that SNET group 420 is docked, via two docking links, to two SNET groups. A simplified presentation, representative view, or the like, may present only a view of SNET group 420 being docked with certain capabilities of SNET infrastructure 424. In some embodiments, a member can adjust, toggle, or otherwise manipulate the complexity of the presentation, representative view, or the like such that a partial or full view of the complexity of the docking links, interactions, and the like between the SNET infrastructures, SNET groups, social devices, and the like is presented to a member.

In some embodiments, establishing multiple docking links can provide additional security for access to certain capabilities. For example, where a docking link between SNET group 420 and SNET group 432 provides a docking link 446 with a higher-security link to a certain capability than a docking link 444 to SNET group 444, an indirect link to SNET group 432 via docking links 444 and 437, some combination thereof, or the like, the docking process may include establishing a docking link 446 to provide a more secure link to a certain capability that a link used to access another capability. In some embodiments, establishing multiple docking links can provide more efficient access to capabilities, services, and the like than a single docking link. For example, where a docking process includes a determination that a docking link to both SNET group 432 and SNET group 434 can enable a more efficient access to certain capabilities of SNET infrastructure 424 than a single docking link, a docking process can include, without limitation, establishing multiple docking links 446 and 444 to SNET groups of SNET infrastructure 424.

In some embodiments, a docking link between various SNET groups, social devices, and the like is managed based on various docking specifications. A docking specification can, in some embodiments, manage one or more particular docking links and set forth, for example and not by way of limitation, access limitations, restrictions, grants, and the like associated with various capabilities of an SNET group, security access requirements, periods of access, trigger events upon which access is to be altered, restricted, granted, terminated, or the like. For example, as shown in the illustrated embodiment, SNET group 404 includes docking specifications 406 and 408. Docking specification 406 can, in some embodiments, govern the docking link 407 between SNET group 404 and SNET group 412. Docking specification 408 can, in some embodiments, govern the docking link 409 between SNET group 404 and SNET group 414. A docking specification can be predetermined, in part or in full, by a member of SNET group 404 in advance of a docking, created on the fly as part of a docking process to dock SNET group 404 to another SNET group, provided by the SNET infrastructure, an SNET group that attempts to dock with SNET group 404, some combination thereof, or the like. For example, a member of SNET group 404 may establish docking specification 406 that restricts access by members of SNET group 412 to capabilities provided by SNET group 404 based upon a later trigger event including, without limitation, elapse of a period of time. In some embodiments, a docking specification is specific to certain attributes of other SNET groups and devices, such that the SNET group 404 is docked to various SNET groups with correlating attributes. For example, Docking specification 406 may dictate that SNET group 404 is to be docked, via docking link 407, to an SNET group 412 that is associated with a geographic location that is within a predetermined threshold proximity to a geographic location associated with SNET group 404, and that the docking link 407 is to be restricted, terminated, or the like if the geographic location associated with SNET group 412 ever exceeds the proximity threshold.

In some embodiments, some or all of a docking specification can be adjusted, managed, altered, created, deleted, or the like based upon an input from a user, member, SNET system, SNET infrastructure, docked device, docked SNET group, some combination thereof, or the like. For example, a member of SNET group 404 may establish docking specification 406 to govern docking link 407 with SNET group 412 to restrict access by a member of SNET group 412 to certain capabilities of SNET group 404, and then interact with SNET group 404, SNET infrastructure 402, some combination thereof, or the like, to alter docking specification 406 to provide greater access by a member of SNET group 412 to capabilities provided by SNET group 404. Such management of a docking specification can be performed at any time, on the fly, in an ad hoc process, or the like with regard to an existing docking link, a docking specification governing potential docking links, some combination thereof, or the like.

In some embodiments, a docking specification governing a docking link between a "higher-tier" SNET group and a "lower-tier" SNET group is part of the higher-tiered SNET group. For example, in the illustrated embodiment, where SNET group 404 is a higher-tiered SNET group and SNET groups 412 and 414 are lower-tiered SNET groups, the docking links 407 and 409 between the lower-tiered SNET groups 412 and 414 and the higher-tiered SNET group 404 are governed by docking specifications 406 and 408 that are part of the higher-tiered SNET group 404, thereby enabling control by a higher-tiered SNET group over docking links with lower-tiered SNET groups.

In some embodiments, a docking specification can be tailored by a user, member, SNET system, SNET infrastructure, SNET group, social device, some combination thereof, or the like to provide various levels of interaction and access between various docked SNET groups. For example, in the illustrated embodiment, docking specification 406 may dictate that docking link 407 provides full bi-directional interactions, sharing of information, services, and the like between SNET groups 404 and 412 that are docked via docking link 407. In another example, docking specification 408 may dictate that docking link 409 provides a one-way group-to-group service access between SNET group 404 and SNET group 414 via docking link 409, such that a member of SNET group 414 can access at least some services provided by capabilities of SNET group 404, but a member of SNET group 404 cannot access some or all information, services, devices, or the like associated with SNET group 414. For example, where a hotel guest's SNET group is docked with a hotel's SNET group to grant the hotel guest access to hotel service capabilities via the hotel's SNET group, a docking specification governing the docking link between the hotel guest's SNET group and the hotel's SNET group may specify that the hotel guest is restricted from accessing certain capabilities of the hotel's SNET group, while the hotel's SNET group is restricted from accessing any of the capabilities of the hotel guest's SNET group including, without limitation, access to devices docked to the hotel guest's SNET group. As discussed above, such access and interaction aspects of a docking specification can, in some embodiments, be altered at any time by various users, members, SNET groups, SNET infrastructures, and the like.

In some embodiments, a docking specification places certain restrictions on capabilities of an SNET group that are provided, offered, or the like to members of docked SNET groups. For example, docking specification 406 may dictate that only certain capabilities of SNET group 404 are to be provided to a member of SNET group 412 via docking link 407. Docking specification 406 may also dictate that each member of SNET group 412 be provided with a distinct access to a distinct one or more capabilities of SNET group 404. For example, docking specification 406 may dictate that each member of SNET group 412 be provided a unique access to one or more capabilities of SNET group 404.

In some embodiments, a docking link between various SNET groups enables access by additional SNET groups to capabilities provided by SNET groups to which additional SNET groups are indirectly associated, docked, or the like. For example, in the illustrated embodiments, where SNET group 404 is docked to SNET group 414 via docking link 409, SNET group 414 is docked to SNET group 420 via docking link 418. Docking link 418 is governed by docking specification 416 in SNET group 414. In some embodiments, a member of SNET group 420 may be granted access to at least some capabilities of SNET group 404 to which a member of SNET group 414 is granted access. Access to capabilities of SNET group 404 by a member of SNET group 420 can be determined by various docking specifications including, without limitation, docking specification 416 that governs the docking link 418 between SNET group 414 and SNET group 420, and docking specification 408 that governs the docking link 409 between SNET group 404 and SNET group 414. For example, docking specification 408 may grant access by a member of SNET group 414 to certain capabilities of SNET group 404 via docking link 409 by restrict access to capabilities of SNET group 404 by a SNET group that is docked to SNET group 414. In another example, docking specification 416 may specify that a member of SNET group 420 may access none, some, all, or the like of the capabilities of other SNET groups including, without limitation, SNET group 404 to which SNET group 414 is docked.

In some embodiments, various SNET groups can be docked to each other, such that some or all of the docked SNET groups gain access or some or all of the capabilities of the other docked SNET groups. In the illustrated embodiment, for example, SNET infrastructure 424 includes SNET group 426, which is docked, via docking link 429 governed by docking specification 428, to SNET group 432 and is also docked, via docking link 431 governed by docking specification 430, to SNET group 434. In addition, SNET group 434 is docked, via docking link 437 governed by docking specification 436, to SNET group 432; as a result, SNET groups 426, 432, and 434 are each docked to each other. The docking links between the SNET groups 426, 432, and 434 can provide various levels of access including, without limitation, various levels of security. In addition, in some embodiments, docking to one of the SNET groups in SNET infrastructure 424 can grant access to some or all of the capabilities of some or all of the SNET groups to which the one of the SNET groups is docked.

For example, in the illustrated embodiment, SNET group 404 can be docked to SNET group 426 via docking link 439. Communication flowing through the docking link 439 can be subject to various docking specifications depending on the origin and destination of the communication flow. For example, for media content originating from the SNET Group 404 via group member devices, storage or services associated directly with the SNET Group 404, or the like, a docking specification 438 can govern any attempted access via a docking link 439 to such media content. Such access can include, without limitation, receipt of media content, delivery of media content, identifying media content, information associated with the media content, some combination thereof, or the like. For example, where a foreign SNET group, including, without limitation, an SNET group associated with a separate SNET infrastructure, docks to an SNET Group 404 that includes a first, second, and third media content originating from the SNET Group 404 via group member devices, storage or services associated directly with the SNET Group 404, or the like, the docking specification 438 may specify that: 1) the first media content is not to be identified to at least the foreign SNET group as existing, 2) the second media content can be identified to at least the foreign SNET group as existing but requires a high level of DRM and is offered at a reduced quality; 3) the third media can be identified to at least the foreign SNET group as existing and is offered in its original form without redistribution and consumption restrictions; some combination thereof, or the like. The docking specification 438 may also limit access by the SNET Group 404, allow application of the same or further restrictions already placed on the SNET Group 426, SNET group 404, some combination thereof, or the like. Likewise, docking specification limitations placed on data or media content originating from the SNET Group 414 may permit chained access by the SNET Group 426, 432, 434, some combination thereof, or the like via a one or more of SNET group 404, SNET group 420, some combination thereof, or the like.

In addition to various docking specification limitations applying to local group offerings, various docking specification limitations may also apply to chained offerings. For example, the SNET Group 414 may freely provide access by any other SNET group, via a direct docking link to SNET group 414, via an indirect link via a docking link to an SNET group that is docked to SNET group 414, some combination thereof, or the like, to all offerings including, without limitation, services, content, data, access to docked devices, some combination thereof, or the like. Such freely-provided access can be defined, in some embodiments, via the docking specification 416. However, the docking specification 438 may place restrictions on access via SNET group 404 including, without limitation, not permitting any access, knowledge of, or the like with regard to some or all offerings from any external SNET group to which SNET group 404 is docked including, without limitation, SNET Groups 414, 412, and 420. In this way, depending on the docking linkage and chained SNET groups and device specifications, offerings may be managed in various ways depending on underlying needs. In some embodiments, such linkages and chain management of overall offerings apply twice: one for each direction of access. For example, offering restrictions associated with the SNET infrastructure 402 can be completely different from those of the SNET infrastructure 424. In addition, even though all relevant docking specifications within the SNET infrastructure 402 may permit at least limited access to a particular offering to the SNET Group 426, such access may not extend to, for example, the SNET Group 432 due to: a) the docking specification 428 placing further access restrictions beyond those required by the SNET infrastructure 402, b) a relevant docking specification within the SNET infrastructure 402 may limit foreign linkages, some combination thereof, or the like.

For example, in an ad hoc travel network docking configuration, a personal SNET group construct of a traveler (e.g., the SNET infrastructure 402) might desire to provide very limited access to a hotel's SNET group construct (e.g., the SNET infrastructure 424), while in the other direction the hotel's SNET group construct offerings may be freely provided. Each construct need only provide access to whatever offerings, membership identification, information, and the like that they would like to expose. A traveler may choose to expose, for example, a) a payment service element located somewhere within the overall personal SNET group construct, b) the traveler's social smartphone's incoming message service; c) an administrator's incoming message service; d) a travel document storage service; some combination thereof, or the like, while the hotel may choose to expose capabilities, offerings, and the like including, without limitation, 1) a regional directory, a map and other information services; 2) a concierge service; 3) a billing service; 4) a reservation service; 5) networked office equipment; some combination thereof, or the like. Exposure in either case can be defined, for example, via various docking specifications associated with the originating SNET group as modified by the docking specifications associated with the SNET groups in the chain pathway to the destination.

In some embodiments, docking specifications can be extended to provide resolution beyond that of a group level. For example, the docking specification 428 governing docking link 429 may require human identification and various levels of security before providing access, including even offering identification, via docking link 429. In another example, as defined by the docking specification 428, a traveler, which can be a member of the SNET Group 404, may gain access to a particular offering provided by one element, service or device participant in the SNET Group 426 via a required secure interaction with the traveler's local social smart phone docked to SNET group 404, but some or all other members of SNET group 404, other SNET groups, or the like may not gain access to the particular offering. In other words, for one or more particular SNET group offerings, capabilities, offering identifiers, and the like, and for one or more particular group members, membership information, and the like, particular chained docking specification details can be established to manage overall access, including, without limitation, limited access. So, although shown functionally as being distributed, being associated with each link, and the like, chained docking specification flow can be managed by a single user interface, and may be stored in a single database construct.

In some embodiments, default docking specifications can apply a default treatment of offerings, access, interactions, or the like with regard to one or more particular SNET groups, but permit specific offering modifications, other access modifications, some combination thereof, or the like where needed by authorized members, devices, SNET systems, SNET groups, SNET infrastructures, some combination thereof, or the like. Likewise, overall default treatment can be modified, as well.

In some embodiments, a docking specification can be part of one or more SNET groups, SNET infrastructures, social device, some other entity, some combination thereof, or the like. For example, where a docking process to dock SNET group 404 to SNET group 426 is initiated by a device docked to SNET group 404, docking specification 438 may be a part of SNET group 404. In addition, where a docking process to dock SNET group 404 to SNET group 426 includes some part of SNET infrastructure 424 receiving and granting a docking request from some part of SNET infrastructure 402, docking specification 438 may be a part of SNET group 426. In some embodiments, a docking request can include, without limitation, a request to dock one SNET group to another SNET group, a request to provide a first SNET group's capabilities, including without limitation services, access to devices, applications, and the like, to one or more devices docked to a second SNET group. A docking request can originate from a device docked to the first SNET group, a device docked to the second SNET group, a member of the first SNET group, a member of the first SNET group, a third-party, some combination thereof, or the like.

By docking to SNET group 426, SNET group 404 may access some or all of the capabilities of SNET group 432 and SNET group 434, as specified by one or more of docking specifications 438, 428, 430, and the like; conversely, where SNET group 404 docks with SNET group 434, SNET group 404 may access some or all of the capabilities of SNET group 426 and SNET group 434, as specified by one or more of docking specifications 438 and 436.

In some embodiments, docking various SNET groups with various SNET groups in various SNET infrastructures can include various access restrictions and limitations. For example, where SNET group 404 is docked to SNET group 414, which is docked to SNET group 420, all within SNET infrastructure 402, various levels of interaction and access by the various SNET groups can be determined via management of the various docking specifications 408 and 416 governing the docking links. All three docked SNET groups 404, 414, and 420 can be enabled to have access to some or all of each other's capabilities, SNE group 414 may have access to capabilities of SNET group 404 while SNET group has access to capabilities of SNET group 414, SNET groups 404 and 414 may have access to each other's capabilities while SNET group 420 has access to some of the capabilities of SNET group 404 and some of the capabilities of SNET group 414, some combination thereof, or the like. Such interactions, access, dockings, and the like may be performed without any interaction with a third-party entity, third-party SNET group, or the like.

In some embodiments, where a third-party entity, third-party SNET group, or the like is involved in a docking link, additional interaction with third-party entity, third-party SNET group, or the like is required. For example, where SNET group 404 is to be docked to SNET group 426, where the respective SNET groups are part of separate SNET infrastructures associated with separate users, members, or the like, docking, access, or the like may require interaction with a third-party. Interaction may include, without limitation, a security challenge, acceptance, invitation, or the like to a member of SNET group 404 attempting to access a capabilities of SNET group 426. In some embodiments, a docking process between SNET groups associated with separate SNET infrastructures, users, members, or the like can be initiated, managed, or the like by various devices, processing systems, SNET systems, SNET infrastructures, or the like. For example, a docking between SNET group 404 and SNET group 426 may be initiated, managed, or the like by one or more devices docked to SNET group 404, one or more devices docked to SNET group 426, one or more devices docked to a third-party SNET group, one or more processing systems, one or more SNET infrastructures, some combination thereof, or the like.

In some embodiments, a SNET "travel" group facilitates and/or monitors travel activities, activities associated with an aspect of a social device, an aspect associated with the social device, an SNET group associated with a member, some combination thereof, or the like. An activity can include one or more events, which can include trigger events, the occurrence of which can influence at least one aspect of the SNET group, including, without limitation, membership, information access, some combination thereof, or the like. The SNET travel group can be docked to SNET groups comprising entities relevant to one or more activities including, without limitation, travel companions, family members, friends and people to be visited, restaurants; coupon/rebate services; etc. A member of an SNET travel group (which can be temporary or persistent) can receive, without limitation, detailed hotel information (including confirmations, rates, feedback, amenities, restaurant recommendations, nearby attractions, etc.), an attendee list for a social event/excursion, babysitter monitoring services, some combination thereof, and the like. In some embodiments, one or more elements associated with the SNET travel group can be managed by one or more processing systems, server devices, network nodes, remote devices, social devices, or the like in response to one or more trigger events, inputs from one or more SNET group members, inputs from one or more SNET group nonmembers, input from one or more devices, some combination thereof, or the like.

Figure 5:
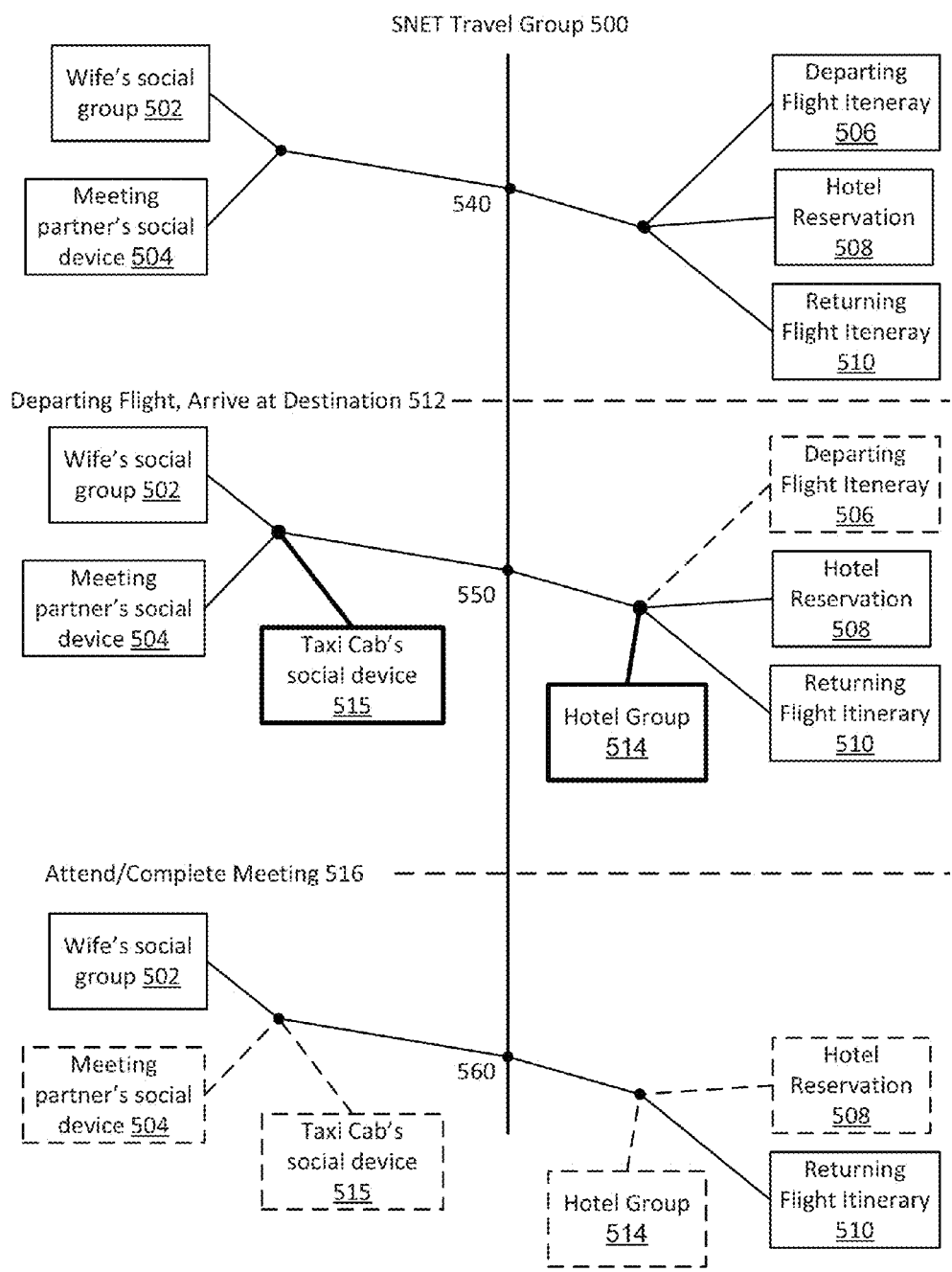
FIG. 5 illustrates a sequence diagram depicting travel social networking according to various embodiments of the disclosure.

FIG. 5 illustrates an embodiment of a social networking environment that adapts to trigger events, triggers, or the like. Some embodiments of SNET groups can respond to externally-applied or internally-applied trigger events, such as completions of certain events, changes in location, elapses of time, some combination thereof, and the like. The illustrated embodiment, shown in FIG. 5, is an SNET group that is designed to be used during travel, such that the SNET travel group 500 responds to completions of certain travel events, changes in location, and upcoming events by adding, removing, or otherwise modifying the information, access, and members of the SNET group. The illustrated embodiment also illustrates the changes that the SNET travel group undergoes as a trip progresses. The illustrated embodiment shows a SNET travel group for a short business trip that involves departing and return flights, a stay in a hotel at the destination, and a meeting with some various partners at the destination.

As shown in state 540, at the beginning of the trip, the SNET travel group 500 includes two docked entities, a social group 502 associated with the traveler's wife and a social device 504 associated with the individuals with whom the traveler is to meet at the destination. In some embodiments, members of the SNET travel group 500 can include an SNET account dedicated to the SNET travel group 500 members, such that any social device associated with the member is a part of the SNET travel group 500. In addition to the docked entities 502 and 504, the SNET travel group at state 540 includes the traveler's flight itineraries 506 and 510 for his departure and return flights, as well as information 508 related to his hotel reservation. All of the above memberships and information can be added to, altered, and removed from the SNET travel group manually by the traveler or some other entity, by a travel agency or device, by a member of a docked group 502, by a user of a docked device 504, or some other internal logic of a social device, SNET, or the like.

As shown by line 512, after the traveler completes his departure flight and arrives at his destination, his SNET travel group 500 adapts to state 550. The adaptation can be partially or fully implemented by manual input from the traveler to the SNET travel group 500, automatically by a social device associated with the traveler, a processing system, infrastructure, or the like to which the traveler has provided one or more authorizations, association rules, or the like that set conditions under which SNET groups, social devices, and the like having various attributes are to be docked, granted more or less access, and undocked as desired, based upon one or more trigger events as determined by one or more social devices, processing systems, some combination thereof, or the like. As the departure flight is completed, the SNET travel group 500 removes the departure flight itinerary 506 from the information associated with the SNET travel group 500, as that event has been completed. In addition, in response to the change in location, SNET travel group 500 can dock to an SNET group 514 associated with the traveler's hotel reservation 508, and dock to one or more potential taxi cabs' social devices 515 in accommodation, anticipation, or the like of the traveler's likely needs.

As shown by line 516, upon completion of the traveler's meeting and his preparation for his return flight, SNET travel group 500 has adapted to state 560, in response to the completion of his meeting and his checking out of his hotel. As the traveler checks out of his hotel, the hotel's SNET group 514 and the taxi cab social devices 515 are undocked from the SNET travel group 500, while the hotel reservation information 508 is removed from the SNET travel group 500. Also, the meeting partners' devices 504 are undocked from the SNET travel group 500, as the meeting is complete, and they no longer have interest in the traveler's trip. The only remaining items included in, or docked to, SNET travel group 500 are the traveler's upcoming return flight itinerary 510 and the social group 502 associated with the traveler's wife.

In some embodiments, as a traveler's trip progresses, adding, altering, and removing certain information, docking to, altering access for, and undocking from certain devices and groups enables the traveler to interact with information and entities that are most relevant to the current and upcoming likely trip events, such as reaching a new destination, preparing for an event, finding landmarks, restaurants, lodging, and the like.

In accordance with various embodiments, various techniques (such as techniques described elsewhere herein) can be employed to determine the existence and location of SNET infrastructures, SNET groups, SNET sub-groups, docked social devices, some combination thereof, or the like. Such location information can be utilized in a variety of ways including, but not limited to, those described below. For example, SNET location services could utilize one or more of the following standards: GPS, LTE eNB, (IP) address, NFC (Near Field Communication), Bluetooth, WiFi, infrared, etc., and, of course, account metadata. Cloud-based storage can be utilized for various information, including location (e.g., GPS), to extend social network functionalities (for example, automatic SNET grouping/introductions, automatic servicing/selection of peripheral devices, etc.). Location-based groups might also be formed for travel, tracking, invites (and timeouts), etc. Location data, as well as other factors, can also be used, in some embodiments, to select online gaming competition/teams. For example, IP address selection can be conducted in a DNS-like manner for a relevant domain name. In operation, a SNET/SNET group of game players or the like can be formed based on location factors, SNET/SNET group attributes, network attributes, some combination thereof, or the like.

In some embodiments, an SNET group member can dock an SNET group, including, without limitation, a SNET travel group 500 to one or more SNET infrastructures, SNET groups, or the like, to engage in gaming and gambling actions. For example, a traveler entering a casino, arcade, or the like may add a gambling credit account to his SNET travel group and utilize the account to interact with and play various gambling and gaming activities. In some other embodiments, an SNET member can establish a game over a network by adding a social gaming device to an SNET group. Also, SNET members can be, in some embodiments, added to one or more SNET groups dedicating to gaming activities based upon certain information associated with the SNET member, such as device connection speed, device capabilities, gaming score, or the like.

Figure 6:
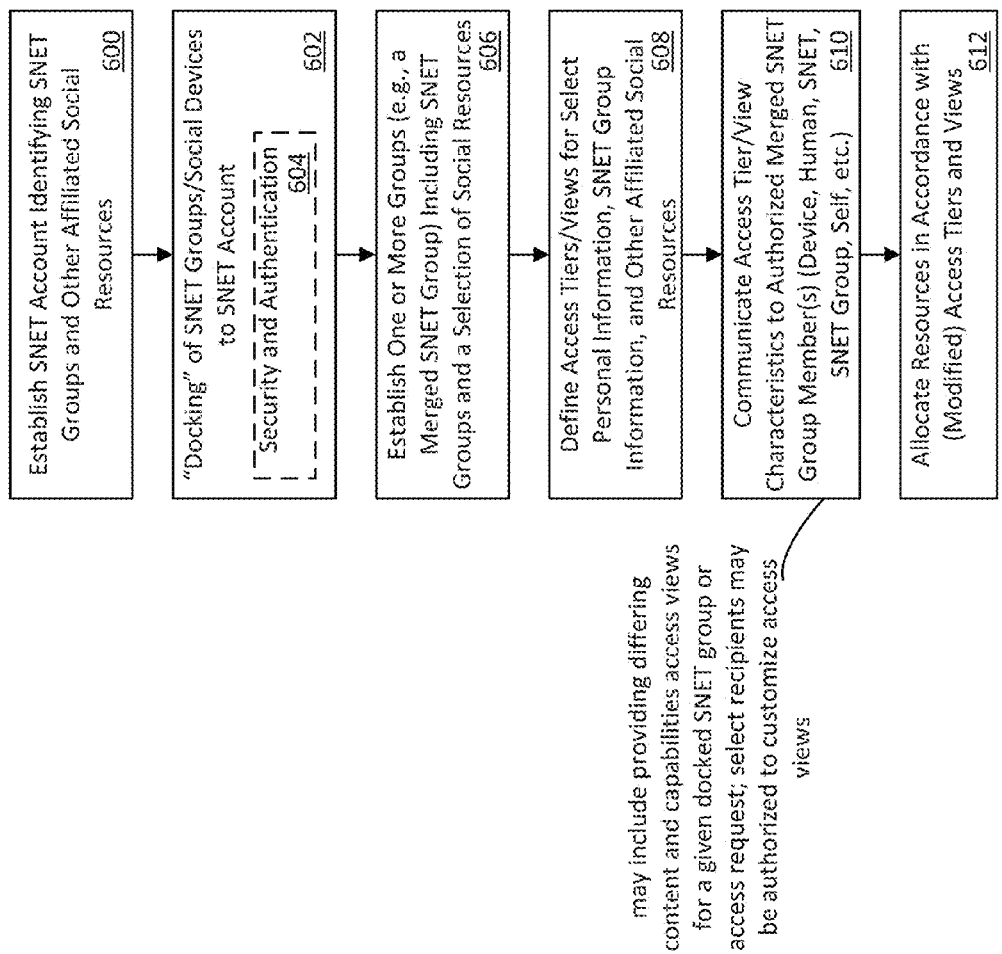
FIG. 6 illustrates a flowchart according to various embodiments of the disclosure.

FIG. 6 is a logic diagram of an embodiment of a method for allocating social resources in accordance with various embodiments. In an initial step 600, some part of an SNET infrastructure including, without limitation, one or more SNET members, processing systems, social devices, network nodes, some combination thereof, or the like establishes an SNET account that identifies associated SNET groups and social resources, which can include one or more capabilities provided by one or more devices, applications, services, SNET groups, some combination thereof, or the like. Next, or contemporaneously, in step 602 one or more social resources, SNET groups, and the like are "docked" (e.g., online, through near-field communications (NFC) coupling, or via networked operations) to the SNET account. Such docking may involve security and authentication operations 604. In some embodiments, such docking can include establishment of a merged SNET group that incorporates docked SNET groups, social resources, and the like.

The method continues in step 606 with the creation of one or more SNET groups or (sub)groups (e.g., a merged SNET group) including the docked SNET groups and a selection of the social devices, applications, services, other social resources, some combination thereof, or the like having related or specific characteristics and interdependencies, etc. In one embodiment, the SNET groups and social resources may be docked through a drag-and-drop user interface or other means. In step 608, access tiers and views are manually or automatically defined for select personal information, SNET group information, social resource information, social device information, and other affiliated resources. This step may be conducted in whole or part by means of a (pop-up) table or form that requests tier settings and allows for personal tailoring of same. The some part of an SNET infrastructure may select a particular SNET group, social device, SNET member (device or human or self) associated with one or more SNET groups and SNET devices, to reveal tier characteristics and allow modification of access rights. In some circumstances, selection of access rights may be based on profile data and other characteristics of a particular device, user or group seeking access to social resources. Further, distinct access rights, including content and capabilities access views, may be assigned to different social device resources or groupings of resources, or to a particular request for access to social resources.

In step 610, access tier/view characteristics are communicated to authorized merged SNET group members, which may include social devices (including the member's social devices), human members, a SNET or one or more SNET groups. Next, in step 612, social resources are allocated in accordance with the access tiers and views communicated in step 610. Allocation of a social device resource may entail, for example, allocating the resource for dedicated use by a member of a docked SNET group, either on a persistent or temporary basis, subject to reallocation. Subsequent reallocation may occur, for example, if access to a previously allocated social device resource is requested by a member (or non-member) of a second SNET group having a higher priority or superior access rights to the resource. In some embodiments, social resources may be dynamically offered and allocated if/when and to the extent such resources become available. Management of social resource reserves, including termination of related services, may be performed by individual devices, groupings of devices, and/or centralized or distributed SNET processing circuitry, including, without limitation, one or more processing systems, and software.

Figure 7:
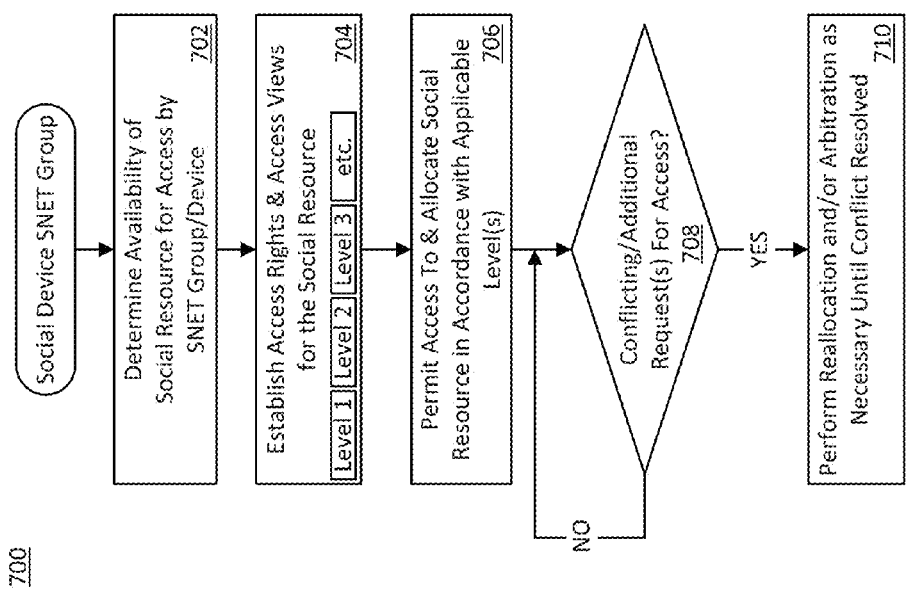
FIG. 7 illustrates a flowchart according to various embodiments of the disclosure.

FIG. 7 is a logic diagram of an embodiment of a method 700 for establishing tiered views of and access to social resources of a first social device SNET group in accordance with various embodiments. First, the availability of a social resource for access by SNET groups/devices is determined in step 702. A social resource can include, without limitation, one or more capabilities provided by one or more SNET groups, SNET infrastructure, some combination thereof, and the like. Next, access rights and access views including, without limitation, one or more representative views for the social resource are established in step 704. Such access rights and access views may provide for various levels of access having varying degrees of granularity as contextually appropriate and as determined by one or more SNET nodes, processing systems, devices, some combination thereof, or the like having control of the social resource, or as determined by an authorized entity requesting access to the social resource.

Established levels of access rights are then applied to permit access to and allocation of the social resource in step 706. If conflicting, modified or additional requests for access are identified in step 708, reallocation and/or arbitration is performed in step 710 as necessary to address conflicts or otherwise service such requests. In one embodiment wherein a particular SNET group, social device, user associated with one or more SNET group or social device, some combination thereof, or the like requires or requests a relatively large percentage of available resources, access may be denied or restricted, including on a temporary or persistent basis. Alternatively, other capable and available social resources may be employed to resolve such requests. Potential overuse or abusive use of an SNET resource may be detected by SNET monitoring functionality including, without limitation, one or more processing systems, devices, network nodes, some combination thereof, or the like that employs static or dynamic thresholds.

Figure 8:
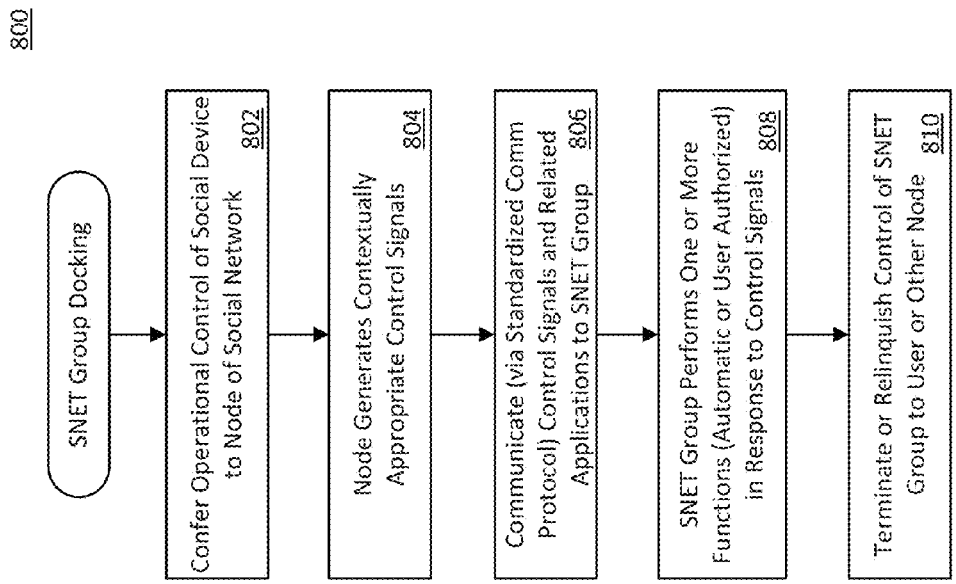
FIG. 8 illustrates a flowchart according to various embodiments of the disclosure.

Referring now to FIG. 8, a logic diagram of an embodiment of a method 800 for controlling operation of an SNET group in accordance with various embodiments is shown. Upon activating or docking a social device, first SNET group, SNET sub-group, a social device docked to the first SNET group, or the like to a second SNET group, an SNET infrastructure, one or more processing systems, devices, and the like associated with an SNET infrastructure, or the like, account information is automatically (or via a setup-up prompt) provided to the social device, first SNET group, SNET sub-group, a social device docked to the first SNET group, or the like. Next, in step 802, operational control of a social resource associated with the second SNET group, an SNET infrastructure, one or more processing systems, devices, and the like associated with an SNET infrastructure, or the like group, which can include, without limitation, a service, device access, application, social resource, some combination thereof, or the like is conferred to a node of the social device, first SNET group, SNET sub-group, a social device docked to the first SNET group, or the like. This node then generates contextually appropriate control signals as shown in step 804.

In step 806, the control signals and contextually-related applications are communicated to the second SNET group, an SNET infrastructure, one or more processing systems, devices, and the like associated with an SNET infrastructure, or the like (via a standardized communication protocol). In response to the control signals, the second SNET group, an SNET infrastructure, one or more processing systems, devices, or the like associated with an SNET infrastructure, or the like performs one or more functions, either automatically or as authorized by a user, in step 808. In subsequent step 810, control of the second SNET group, an SNET infrastructure, one or more processing systems, devices, and the like associated with an SNET infrastructure, or the like is terminated or relinquished to a user, processing system, device, some other entity, some other SNET node, some combination thereof, or the like.

In certain embodiments, some SNET groups may support only one member interaction at a time, with or without simultaneously supporting the underlying owner/member. Other SNET groups may support many multiple members (devices/humans) accessing capabilities provided by the SNET groups, as well as having dedicated functionality reserved for an owner. A standardized or manufacturer proprietary approach to control and certification marking may account for such variations in SNET group capabilities. Monitoring and snooping of content (e.g., for purposes of protecting copyright owners) and like functionality could also be accomplished through compliance with a standardized protocol.

Figure 9:
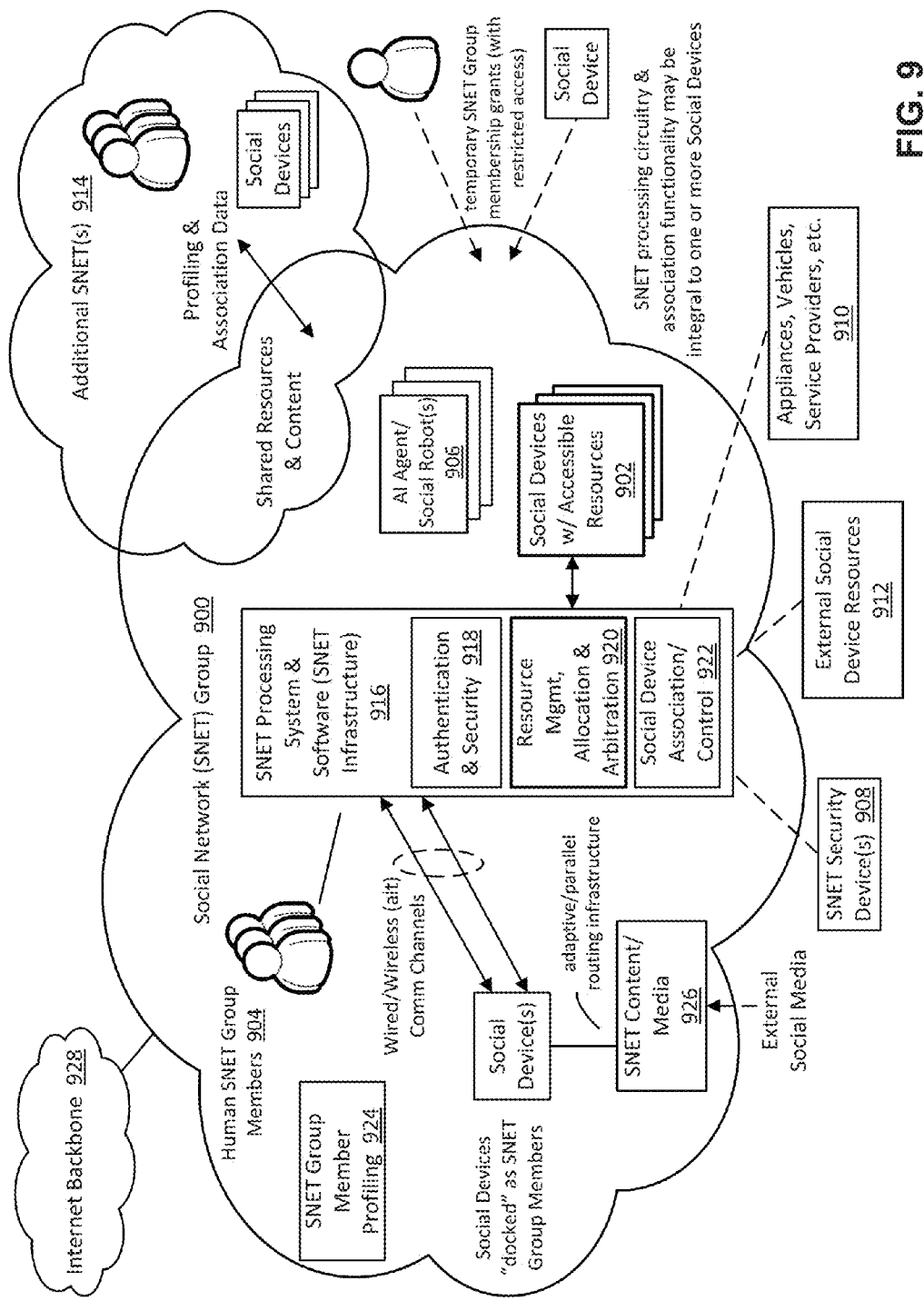
FIG. 9 illustrates an embodiment of a social networking environment according to various embodiments of the disclosure.

Referring now to FIG. 9, a social network circle/group 900 (hereinafter "Social networking group", "social networking circle", "SNET circle", "SNET group", or the like) comprising social devices with 902 is shown. Beyond traditional social networking features and services, an SNET group 900 and associated social devices 902 according to various embodiments include numerous novel features and attributes as described more fully below with general reference to the illustration.

Briefly, membership in the SNET group 900 may comprise docked social devices 902 with resources that are accessible to other members of the SNET group 900 and human SNET group members 904, as well as proxies thereof. Further, SNET group 900 nodes may include device services and software (e.g., applications) of various types participating as members. By way of example, SNET group members might include artificial intelligence agents/social robots 906, SNET security device(s) 908, appliances, vehicles and service providers 910, common or authorized members/functionality of other SNET groups 912, etc. Further, access to specific content and resources of a SNET group 900 may be shared with members of additional SNET(s) 914, including remote or web-based applications. Such access can be conditioned on acceptable profiling and association data. Similarly, social devices, SNET groups, individuals, or the like may be granted temporary or ad hoc memberships, with or without restricted access.

In the illustrated embodiment, formation, maintenance and operation of SNET group 900 is performed by one or more SNET processing systems and software 916. A processing system can include, without limitation, one or more instances of standalone SNET processing circuitry, one or more instances of distributed SNET processing circuitry located on one or more devices, social devices, server devices, network nodes, and the like. It is noted that the "SNET processing circuitry" may comprise hardware, software, applications, or various combinations thereof, and be configurable to support various functionalities disclosed herein. Further, the SNET processing system 916 may be included in a standalone server, server farm, cloud-based resources, and/or the various types of devices described below, and incorporate authentication and security functionality 918. In addition, specialized middleware may also be utilized by SNETs according to various embodiments, including standardized middleware (or standardized communication protocols) with an associated certification process. Interactions and interdependencies within the SNET group 900 may involve one or more of an adaptive resource management, allocation and arbitration module 920, a social device association/control module 922, and a SNET group member profiling module 924 as described more fully below.

Distribution of internal and external SNET content/media 926 can be accomplished in a variety of ways in accordance with various embodiments. For example, media distribution may involve an adaptive or parallel network routing infrastructure involving a wide variety of communication protocols and wired and/or wireless communications channels. SNET content/media 926 may comprise, for example, various user-driven (advertising) channels, pictures, videos, links, online text, etc. Access to such content, as well as communications with and remote access to social devices 902 of the SNET group 900, may occur over an Internet backbone 928, cellular communication system, WAN, LAN, etc.

A member of a SNET in accordance with various embodiments such as those disclosed herein may establish permissions and/or privacy settings that control and restrict who or what may access the member's profile(s) information, connections and groups, as well as define desired degrees of access. Permissions may enable the user to maintain certain information as private or available on a permissive basis only. For example, visibility of specified user information may be limited to users/devices in a SNET(s). Alternatively, specified user information may be publicly available. Likewise, a SNET member may selectively decide to permit others to access personal information such as name, gender, contact information/email address, etc.

Figure 10:
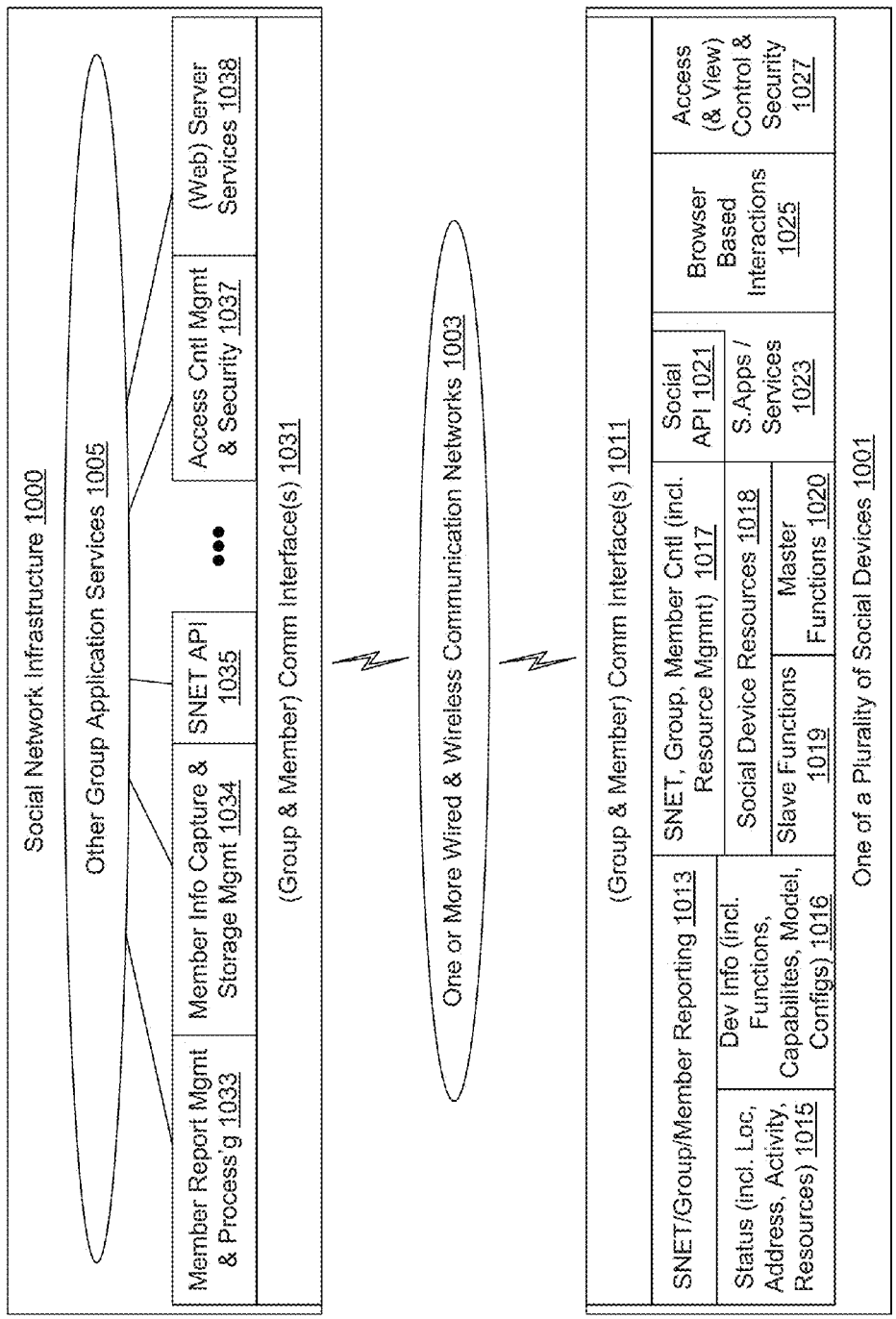
FIG. 10 illustrates a social network infrastructure and social devices in accordance with various embodiments of the disclosure.

FIG. 10 is a functional block diagram illustrating a social network (SNET) infrastructure 1000 and (member) social device(s) 1001 in accordance with various embodiments. Communications between the social network infrastructure 1000 social device(s) 1001 and other SNET members may occur over one or more wired and wireless communication networks 1003. The SNET infrastructure 1000 and social device(s) 1000 are coupled to the communication networks 1003 by communication interface(s) 1031 and 1011, respectively, either of which may support communications with individual SNET members, groups of SNET members, or classes of SNET members.

The SNET infrastructure 1001 of the illustrated embodiment includes a number of functions and resources to support formation and maintenance of a SNET having social device members. In particular, member report management and processing 1033 receives information from SNET/group/member reporting functions 1013 in associated social devices 1000. Such information may include, for example, status data 1015 regarding the location, address and activities of a social device 1000 and/or device user.

In addition, the social device 1000 may provide device information 1016 indicating, for example, device functions and social capabilities, device model number(s), device configurations, software versions, attached peripherals and downstream (social) devices, device resources and usage, etc. Device information 1016 relating to available resources and current resource usage may be utilized by the SNET infrastructure 1001 for purposes of SNET resource management, including dynamic resource allocation and arbitration.

In various embodiments, the social device 1000 may have an obligation to gather, store and/or report device status/information 1015/1016 at different times. For example, reporting may be required upon affiliation or docking with a SNET, on a periodic basis, and/or during operational engagements with other intra- and inter-SNET resources and devices (including upstream and downstream devices).

Referring again to the SNET infrastructure 1001, additional functionality and resources include, without limitation: SNET member information capture and storage management 1034; a SNET application programming interface (API) 1035 that allows SNET associated software components to communicate with each other; access control management and security 1037 for maintaining the integrity of the SNET and affiliated data/resources; and (Web) server services 1038. The social network infrastructure 1001 further comprises other group application services 1005 corresponding to the foregoing, as well as additional services such as those described herein. In one exemplary embodiment, the SNET infrastructure 1001 might determine (e.g., by means of device information 1016) the category and nature of a social device 1000 wishing to participate in a SNET. As necessary, functionality in the SNET infrastructure 1001 could then direct or trigger installation of appropriate application software and underlying drivers in the social device 1000. Such operations might be performed with minimal involvement from inherent functions of the social device 1000.

Figure 11:
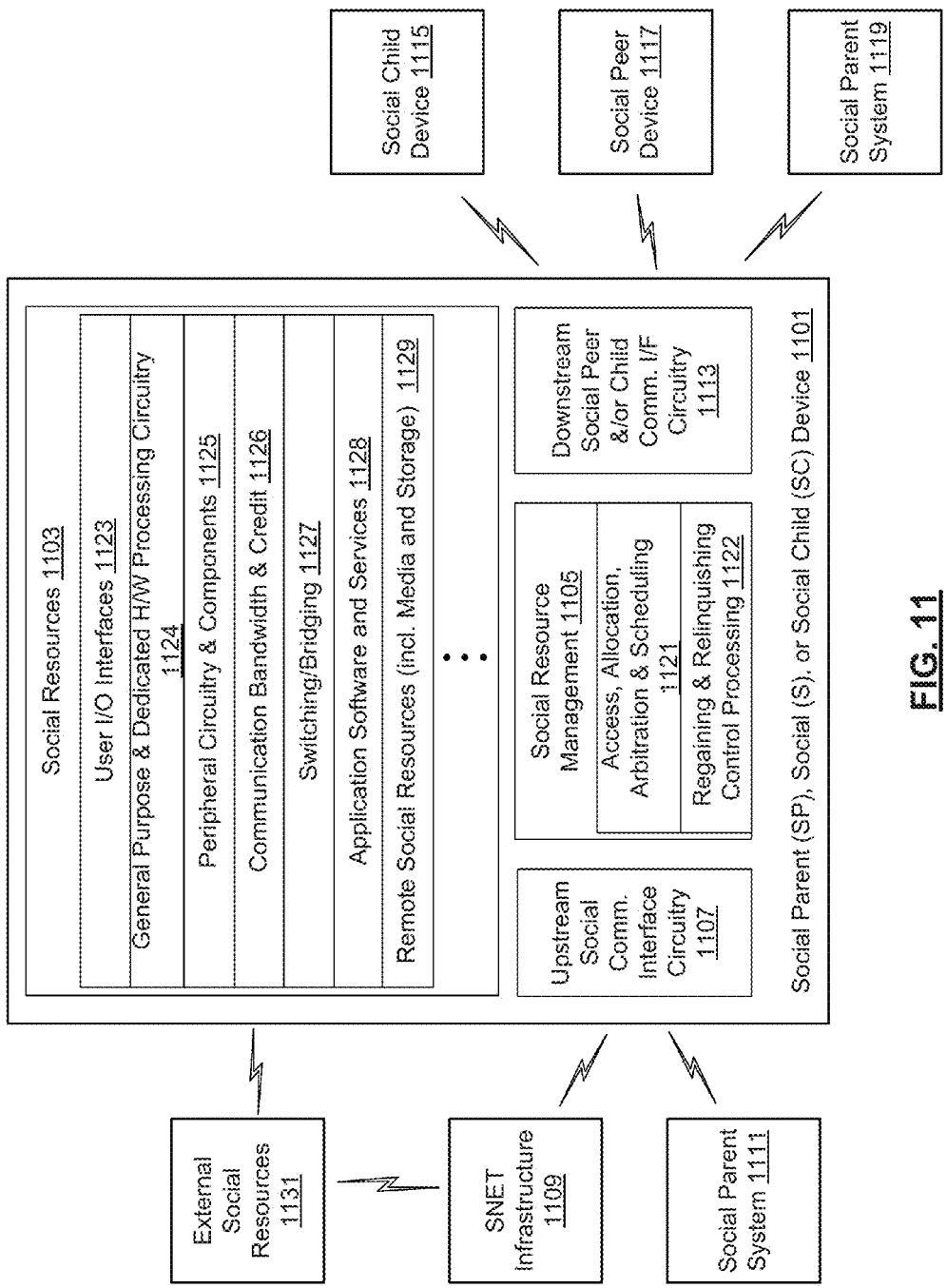
FIG. 11 illustrates a schematic block diagram of an embodiment of a social device according to various embodiments of the disclosure.
Figure 13:
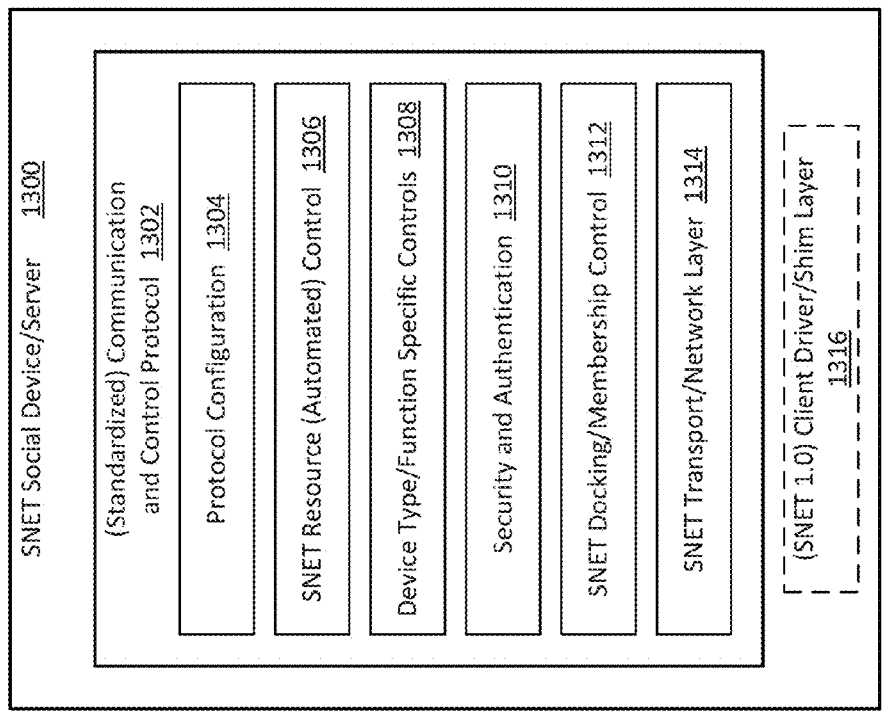
FIG. 13 illustrates a schematic block diagram of an embodiment of a social device/server incorporating communication and control protocol capabilities according to various embodiments of the disclosure.

In the illustrated embodiment, the social device 1000 comprises a number of additional social device resources 1018 (including, for example, the social resources described in conjunction with FIGS. 11 and 13, as well as device status/information 1015/1016) and functions and resources to support participation in a social network. More particularly, SNET, SNET and/or member control functions 1017 may include slave functions 1019, master functions 1020, or various combinations thereof. Slave functions 1019 include, for example, device (re)configuration, directed resource allocation, managed resource arbitration, bridging operations, etc. Master functions 1020 enable the social device 1000 to establish, manage, and terminate various interactions between nodes or groups of nodes in a social network, including interactions involving the social device 1000 itself.

The social device 1000 further includes a social API 1021 and browser-based interaction capabilities 1025 to support, for example, relevant social applications and services 1023 (which might comprise slave and master functions 1019 and 1020). Access control (including access views provided to other SNET group members) and security 1027 layers permit the social device 1000 to interface with or establish secure SNET groups/circles and control access to internal and external SNET resources as described more fully below.

It is noted that numerous of the functional building blocks of the embodiment illustrated by FIG. 10 may be incorporated, in whole or part, in one or more (application specific) integrated circuit devices. For example, an integrated circuit device may comprise a member reporting module to provide member reporting functionality (including communication of device status and device characteristics), device control capabilities, master/slave functions, security and access control modules, etc. Such an integrated circuit device may also include onboard processing capabilities and/or interface with a processor device. Alternatively, several of the functions described above may be incorporated, in whole or part, into an operating system and/or software loaded above an operating system kernel.

Referring now to FIG. 11, a schematic block diagram is shown for a social device 1101 operable to support various resource access interactions with other social devices and social systems in accordance with various embodiments. The social device 1101 is configured with a variety of functions that enable it to operate in a social device "hierarchy" comprising social (S) devices, social "parent" (SP) devices and social "child" (SC) devices. For example, a social parent device may enable a docked social child device to access resources of the parent device and/or connect to and interact with (directly or indirectly) with a social network. The social child device may be configured with inherent social capabilities, or gain access to such capabilities from or through an associated parent device. Further, a human SNET member might have associated social child devices, or be served by a social parent device via a user I/O interface (1123).

A social device 1101 according to various embodiments and applications may also concurrently or selectively function as a social device, SP device, SC device, or even a "grandparent" device that supports (e.g., in a multi-hop environment) a parent device in a SNET group. Dynamic and static hierarchical associations between SP and SC devices may be established in a selective, automatic or automated manner. Further, a social device 1101 may take many forms including, without limitation, a smartphone, personal computer, server, tablet device, access point, gateway, network switch/hub, bridging device, set top box, or other device enabled with social capabilities.

In the illustrated embodiment, the social device 1101 is communicatively coupled to a SNET infrastructure 1109 and/or social parent system 1111 via upstream social communication interface circuitry 1107. Likewise, downstream social peer and/or child communication interface circuitry 1113 enables coupling with a social child device 1115, social peer device 1117 and/or social parent system (device) 1119. Social resources of both upstream and downstream devices may be accessible to one another via the social device 1101.

The social device 1101 of this embodiment includes social resources 1103 that, along with external SNET resources, are managed by a social resource management module 1105 and accessible to at least one other SNET group member. Specific social resources 1103 may include user I/O interfaces 1123, general purpose and dedicated hardware processing circuitry 1124, peripheral circuitry and components 1125 (which may or may not have social capabilities), communication bandwidth and credit determination functionality 1126, switching/bridging functions 1127, application software and services 1128, remote social resources 1129 of the SNET group, external social resources 1131 controlled by the social device 1101, etc. The external social resources 1131 may comprise, for example, an external media/digital library, or content from one or more of cable, satellite and/or terrestrial televisions systems.

Among other functions, the social resource management module 1105 comprises access, allocation, arbitration and scheduling functionality 1121, as well as the functionality for establishing, regaining and relinquishing control processing operations 1122, including operations involving access to social resources 1103. It is noted that counterpart social resource management functionality may be present in the SNET infrastructure 1109 and/or other SNET nodes.

In one exemplary embodiment wherein the social device 1101 comprises a switching bridge, bandwidth capacity may be dynamically allocated by access, allocation, arbitration, and scheduling functionality 1121. Access to bandwidth capacity and other resources of the social device 1101 might be available only upon request, per access views, or per allocation and arbitration functions, and selectively terminated when excessive bandwidth/resources are consumed or requested.

Figure 12:
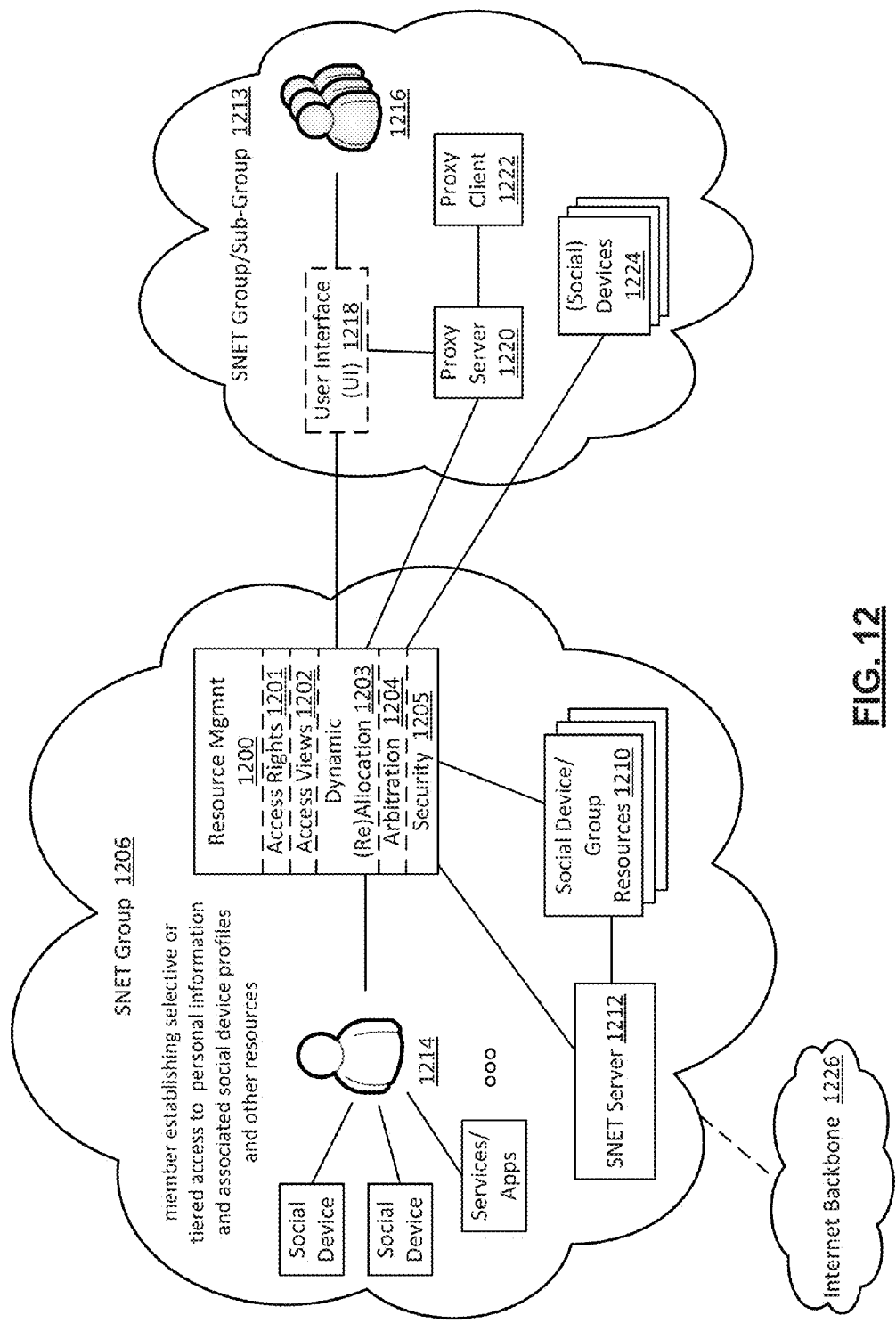
FIG. 12 illustrates a schematic block diagram illustrating access to social resources of a social network group/sub-group according to various embodiments of the disclosure.

FIG. 12 is a schematic block diagram illustrating access to social resources of a SNET group 1206 in accordance with various embodiments. In some embodiments, a member of a social network group ("SNET group") controls different access levels to both personal information (which may be included in a user profile) and associated device profiles and capabilities. Such access rights allow the member to establish selective, restricted and/or tiered access rights and views—for other members of the social/group as well as non-members—to all or some of the member's social devices and resources.

In the illustrated embodiment, a member or device of a SNET group 1204/1206 (or, alternatively, an unaffiliated entity) accesses social device/group resources 1210 associated with the SNET group 1206 via a resource management node 1200. The resource management node 1200 comprises access rights 1201, access views 1202, dynamic (re)allocation functionality 1203, arbitration functionality 1204, and security functionality 1205.

In operation, the access rights 1201 and access views 1202 control differing access levels and access visibility for a member's personal information, device information, data, processing and storage capabilities, and other social resources. Access rights 1201 and access views 1202 can be predefined, for example, based on a SNET group, based on co-member devices, or based on member's own device to device interactions. Such predefinition can be tailored dynamically as needed or as relationships change. Access rights 1201 may also be expanded to support temporary interaction with a guest member or visitor device. For example, a visiting member with a smart phone may be permitted to receive/provide media to a social device residing in a "home group."

In some embodiments, a member of the SNET group 1206 can adjust and modify access rights 1201 on an information-by-information basis, device-by-device basis, member-by-member basis, etc. Through access views 1202, the member might also present itself in various ways depending on context, location, or use-based considerations. For example, a member icon/avatar may present differing characteristics or capabilities that are context dependent, including work, home or social settings. Allocation and, as necessary, dynamic real-location of social resources is performed by dynamic (re) allocation functionality 1203 and arbitration functionality 1204. Access to social resources can be preconditioned on secure access/authentication performed by security functionality 1205.

In addition to social device/group resources 1210, the SNET group 1206 might include, for example, a SNET server 1212 and one or more members 1214 and affiliated social devices, services, applications, files, web pages, connections and other social resources. As will be appreciated, a member 1214, which can include, without limitation, a human member, device member, and the like, can establish selective or tiered access to personal information and associated social device profiles and other resources as described above. In certain embodiments, the resource management node 1200 may be incorporated in the SNET server 1212 or other SNET social device, or administered by a SNET hosting infrastructure, in a standalone manner, distributed manner, or the like. Further, the SNET server 1212 may include a firewall operable to provide secure access and perform basic routing functions.

Access to social device/circle resources 1210 by nodes of the SNET group 1213 may occur in a variety of ways, including via a user interface (UI) 1218 utilized by one or more humans 1216. The UI 1218 might comprise a graphical user interface (GUI) or browser that graphically indicates available resources, voice controls, gesture commands, etc. Access to the SNET group 1206 can also be managed by a proxy server 1220. The proxy server 1220 functions as an intermediary for access requests from proxy clients 1222—including social devices connected to the proxy server 1220 via the Internet or other IP-based networks—seeking to communicate with the SNET group 1206. Social devices 1224 affiliated with a SNET 1213 may have the capacity to interact directly with the SNET group 1206. It is noted that the human members 1216, proxy server 1214 and social devices 1224 may operate independently of a SNET group/sub-group. Further, the proxy server 1214 may be a distributed or cloud-based entity, or a member of (or incorporated in a member of) either the SNET group/sub-group 1213 or SNET group 1206.

FIG. 13 is a schematic block diagram of a social device/server 1300 utilizing a communication and control protocol 1302 that enables various SNET resource and control operations in accordance with various embodiments. In the illustrated embodiment, the communication and control protocol 1302 comprises protocol configuration 1304, SNET resource (automated) control features 1306, device type/function specific controls 1308, security and authentication features 1310, SNET docking/membership control 1312, and a SNET transport/network layer 1314. Various packetization and encapsulation techniques may be utilized for communicating and receiving control signals and data.

In one embodiment, the social device/server 1300 includes a shim layer or client driver 1316 that enables communications with a central SNET management node, SNET infrastructure, one or more processing systems, SNET members and other compatible devices, including social devices that may not fully support a SNET group communication protocol, some combination thereof, or the like. The shim layer or client driver 1316 may be installed through a SNET node or local storage, or downloaded from a manufacturer website or cloud-based resource. Such installation may occur automatically upon power up or activation of the social device/server 1300 or as directed by other SNET nodes.

Management of and access to SNET resources utilizing the communication and control protocol 1302 may be performed by a central management node of a SNET group or SNET hosting infrastructure. The central management node may include integrated artificial intelligence and/or present itself through a "persona" or "avatar". In addition, distributed and delegated control mechanisms, including ad hoc or remote operations that span one or more SNETs, permit one member to interact with their own or another member's social devices via an SNET or SNET defined pathways.

In some embodiments, a standardized version of communication and control protocol 1302—referred to herein as a "SNET 1.0" standard for sake of brevity—is employed to facilitate such SNET interactions (and possibly obviate the need for a shim layer in compliant social devices having defined device type characteristics). Various control operations according to an SNET 1.0 standard may include automated and ad hoc SNET group association, as well as support functions such as automated SNET resource offerings, automated device registration and configuration, upgrade and update maintenance, device-to-device communication session management, tunneling/encapsulation functions, proxy services, social resource allocation, etc. For example, through docking of an affiliated social device in a SNET group, a member may desire to access and control their own remote docked devices, as well as remote docked devices of other members, either directly or via a further user device. In some embodiments, such interaction may be facilitated through a SNET 1.0 compliant approach.

SNET 1.0 compliant devices may be designated as "SNET 1.0 Certified", for example, and provide both system-on-a-chip ("SoC")/hardware and software support peculiar to a particular device family. By way of example, a SNET 1.0 Certified NAS might have storage related, defined control capabilities that include default access tier definitions as described herein, security and DRM features, etc. Such control capabilities differ from, for example, a SNET 1.0 Certified STB (which might have multiple tuners/pipelines for delivering streaming video with certain tuners/pipelines reserved for the device owner according to a setup procedure). Social devices may be configured, manually or through factory-staged settings and security, to delegate membership control to a SNET (1.0) group/server for further applications such as those described below.

Figure 14:
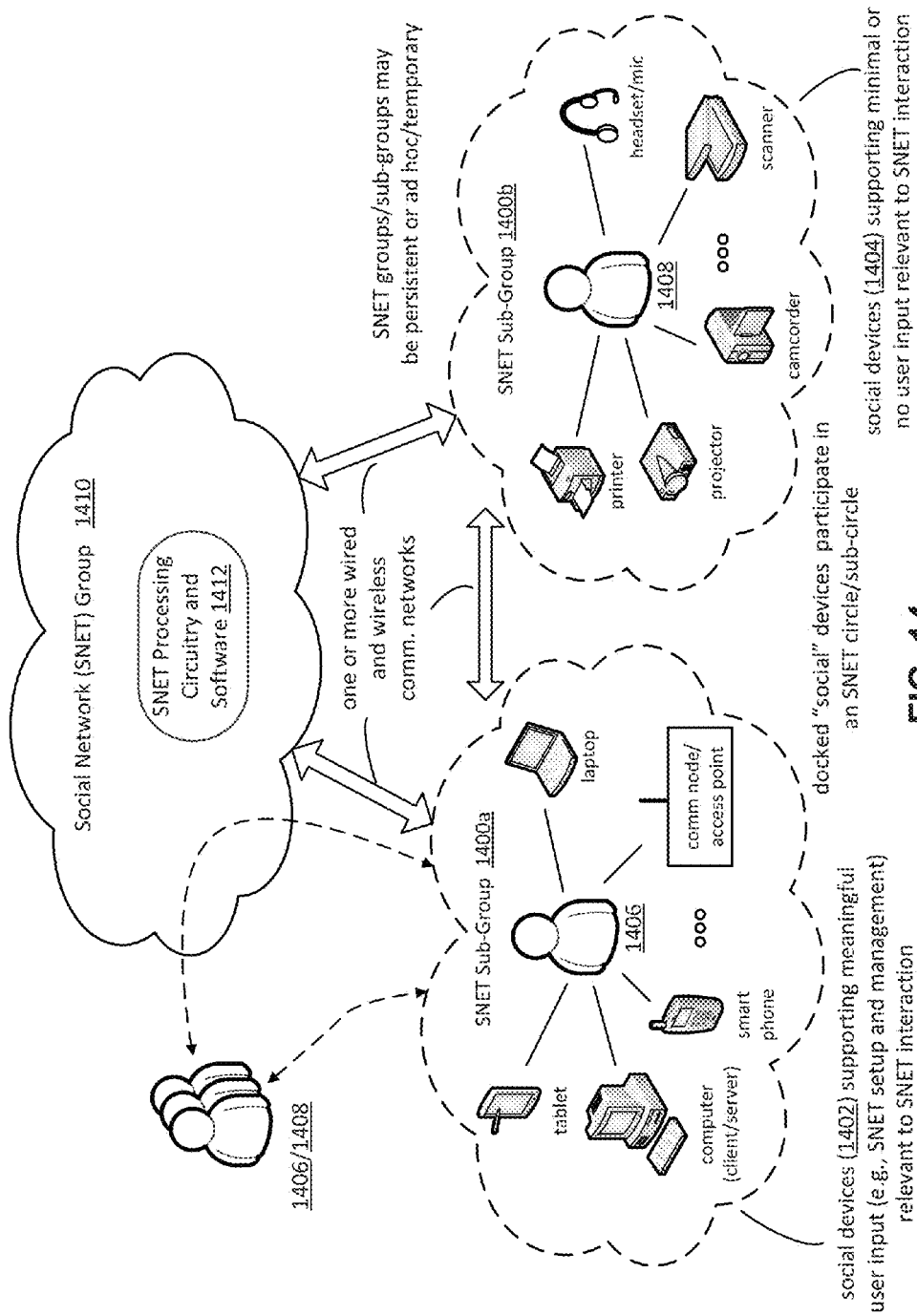
FIG. 14 illustrates social device membership and access in social network groups/sub-groups according to various embodiments of the disclosure.

FIG. 14 illustrates various embodiments of social device membership and accessibility in social network groups/sub-groups in accordance with various embodiments of the disclosure. In some embodiments, membership in a SNET group 1410 may be extended to encompass public and private social devices and equipment. For example, in a SNET group 1410 that includes human members 1406/1408, each human member may have a respective personal SNET sub-group 1400(*a*)/1400(*b*) of associated or docked social devices 1406/1408 capable of independent or aggregated participation in the SNET group 1410. The SNET sub-group may be locally or remotely accessible by a human member 1406/1408 and/or other SNET group/sub-group members through various means, such as clicking on an icon or tag associated with the human member/personal sub-group.

Although SNET sub-groups 1400(*a*) and 1400(*b*) are illustrated as separate sub-groups, such sub-groups may instead comprise a single SNET group or sub-group, or any number of additional SNET groups, SNET sub-groups, or the like, each of which may include various combinations of social devices 1402/1404. Further, SNET processing circuitry and software 1412 of the illustrated embodiment manages formation and operation of the SNET group 1410. The SNET processing circuitry and software 1412 may be incorporated in a standalone server, social devices, and/or cloud-based resources. The SNET group 1410 may be persistent or of limited duration, and include ad hoc and/or static associations.

Social devices 1402/1404 may be broadly categorized as (i) social devices 1402 that include a user or SNET group interface sufficient to provide meaningful input to SNET interaction, (ii) social devices 1404 that support minimal or no user input relevant to SNET interaction, some combination thereof, or the like. More particularly and without limitation, the first category may include computers, tablet devices, IPTVs, IPTV set top boxes, smart phones, servers, laptops, cloudbooks, network attached storage devices, gaming consoles, media players/sources, communication nodes (access points, routers, switches, gateways, etc.), user interface devices, power line communication (PLC) devices, etc. Such social devices may receive user input for SNET setup and management. The second category may include, again without limitation, printers, projectors, cameras and camcorders, scanners, speakers, headsets, smoke detectors, alarm systems, video cameras, mice, etc. In general, dockable social devices include any electronic device that could be operably coupled to or docked in a SNET group/sub-group via wired or wireless pathways to participate as a SNET member.

As will be appreciated, by docking social devices, members of a SNET group 1410 may gain full or partial remote control and interaction such devices via an authorized member SNET account. For example, family members authorized to participate in a "family" SNET group may remotely access docked social devices via one or more associated SNET accounts. Various embodiments for docking and accessing social devices are described more fully below, e.g., in conjunction with FIGS. 15 and 16.

Figure 15:
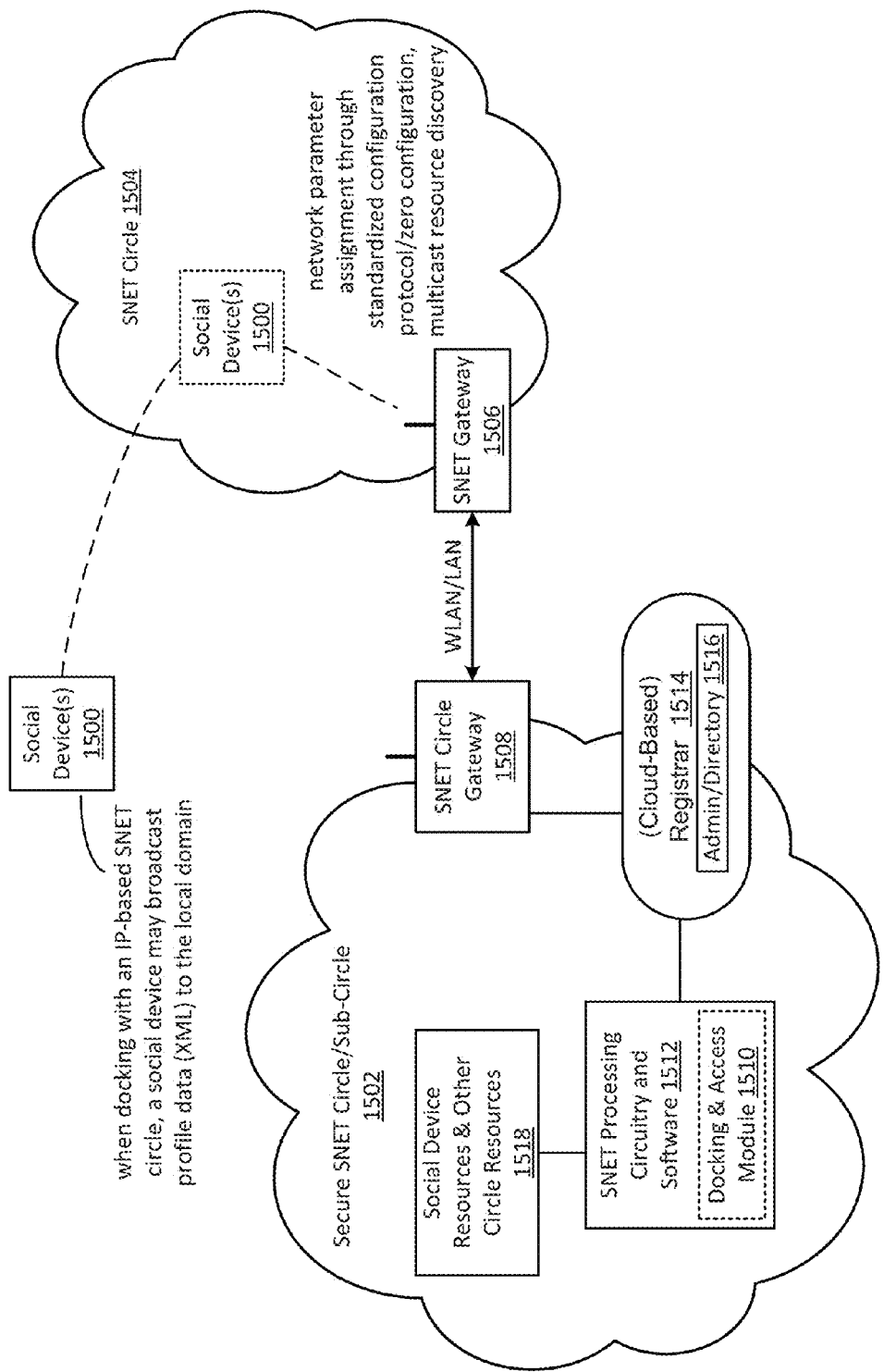
FIG. 15 illustrates remote access to social resources of a social network group/sub-group according to various embodiments of the disclosure.

FIG. 15 is a schematic block diagram illustrating remote access to social resources of a social network group/sub-group in accordance with various embodiments. In the illustrated embodiment, a social device 1500 may indicate a desire to associate, dock, access social device resources and other group resources 1518, or otherwise communicate with a (secure) SNET group/sub-group 1502. The social device 1500 device can be autonomous and independent or, alternatively, a participant in a second SNET group 1504 or other network serviced by the SNET gateway 1506.

In one embodiment, either the SNET gateway 1506 or SNET group gateway 1508 functions as a proxy for the social device 1500. Proxy functionality within the SNET gateway 1506 may be provided by a software application or a computer system (server) that functions as an intermediary for requests from clients (including connected social devices) seeking resources from other servers or gateways such as SNET gateway 1508. Such resources might include files, services, web pages, connections, profiling information and other available social device resources and other group resources 1518.

The SNET gateway 1506 may evaluate requests from social devices according to various filtering rules. For example, the SNET gateway 1506 might filter traffic by IP address or protocol. Once a request from the social device 1500 validated (if necessary), the SNET gateway 1506 connects to the SNET group gateway 1508 over a WLAN/LAN or other communication path and requests access to resources of the SNET group/sub-group 1502 on behalf of the social device 1500.

Membership in the SNET group/sub-group 1502 is established through a docking module 1510 of SNET processing circuitry and software 1512, which may support one or more device discovery and configuration protocols, including standardized protocols. When group membership is restricted, a local or cloud-based registrar 1514 can be employed to provide authentication. The registrar 1514 of the illustrated embodiment may utilize an administrator, or a directory service 1516 such as a Lightweight Directory Access Protocol (LDAP)-based directory server that stores attribute data. LDAP is a well-known application protocol for querying and modifying items in directory service. When docking with an IP-based SNET group, a social device may broadcast profile data to the local domain using a textual data format such as Extensible Markup Language (XML).

Figure 16:
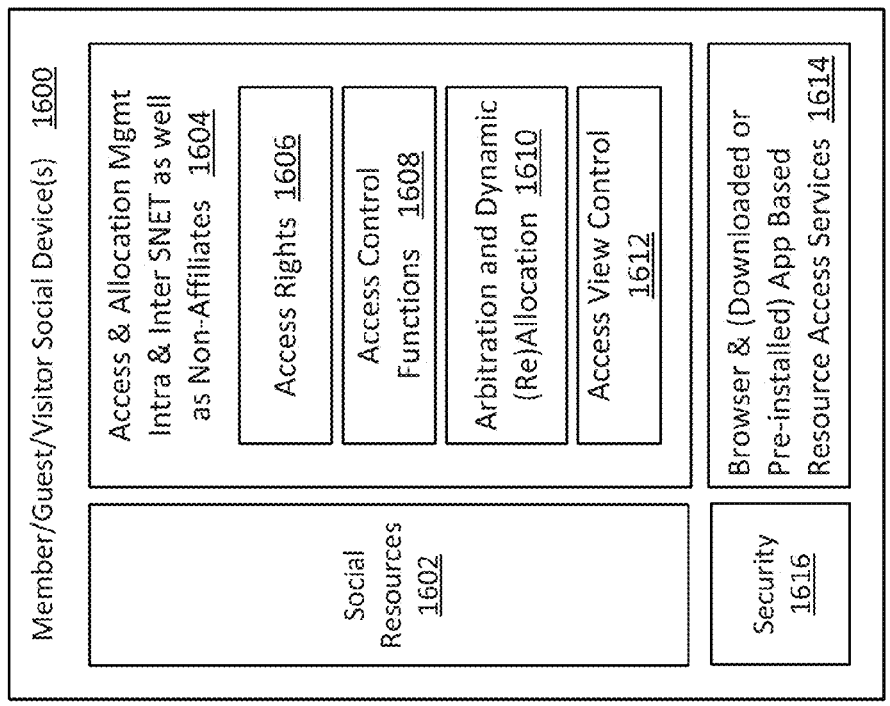
FIG. 16 illustrates a schematic block diagram of an embodiment of a social device comprising integral resource access and allocation management functionality according to various embodiments of the disclosure.

FIG. 16 is a schematic block diagram of an embodiment of a social device(s) 1600 comprising integral social resource access and allocation management functionality in accordance with various embodiments. The social device 1600 may operate as a member, guest member, and/or and authorized visitor of the SNET. Access to and allocation of social resources 1602 of the social device 1600 is controlled by (predefined or user-defined) access and allocation management functionality 1604, operation of which may apply to intra- and inter-SNET membership nodes, as well as interactions between the social resources 1602 and non-affiliated entities. Further, access and allocation management functionality 1604 may be distributed between one or more social devices/SNET hosting infrastructures.

The access and allocation management functionality 1604 comprises access rights 1606, access control functions 1608, arbitration and dynamic (re)allocation 1610, and access view control 1612. Exemplary operation of such functions is described in conjunction with various other Figures herein. Servicing of requests for access to social resources 1602 may be carried out, for example, via a browser and/or downloaded or preinstalled applications 1614. In certain embodiments, access to social resources 1602 is conditioned upon authentication or security operations 1616. In addition, various functional blocks of the social device 1600 may be incorporated into one or more integrated circuit devices, which may be dedicated to support a primary user and/or shared access operations.

FIG. 17 is a schematic block diagram of an embodiment of a social device 1700 comprising integral functionality operable to support social network group/sub-group membership and communications in accordance with various embodiments of the disclosure. In the illustrated embodiment, a communication interface and transceiver circuitry 1702 is operable to perform wired or wireless communications between the social device 1700 and a SNET/SNET group/SNET sub-group 1726 over one or more communication channels. Depending on the capabilities and configuration of the social device 1700, communications with a SNET may be unilateral or bidirectional/interactive, and utilize either a proprietary or standardized communication protocol. Communications may include, for example, device profile information, user and SNET group profile information, control signals, media content, interactions with hosted service data, user data, relayed information, etc.

The social device 1700 further includes processing circuitry 1704 operable to process and manage communications, services and associations between the device and other entities including members of a SNET/SNET group/SNET sub-group 1724, third parties, software agents, etc. More particularly, the processing circuitry 1704 may include, for example, a software management application 1712 comprising one or more of docking logic 1714 (including support for device discovery and configuration protocols such as described below), communication protocol control 1716, resource management 1718, and security/authentication 1720 functionality.

The social device 1700 further may utilize profile information and other resources, that may take many forms and be maintained in static or dynamic memory 1724. Such profile information enables a social device and/or user 1701 to present an image of itself and its capabilities to other members of a SNET. In particular, device/group profile information and other resources 1706 and user profile information 1708 may be utilized in various ways in accordance with various embodiments to facilitate a variety of social interactions. Depending on the capabilities and requirements of a particular device (and other members of a SNET), a device or user profile may be static or dynamic.

In certain embodiments, the social device 1700 may interact with a user(s) 1701 via user interface circuitry 1710. User input to the social device 1700 may include, for example, data entry through a keypad, touchscreen, remote control device, gaming controller, device control buttons, voice or gesture commands, storage device, etc. Authorized access to or control of the social device 1700 can be facilitated through unique biometric identifiers, passwords, token-based identification, trusted authorities or documents such as a driver's license or passport, and like authentication means.

The social device 1700 may perform core or underlying functionality 1720. Alternatively, the social device may primarily function as a social networking interface or communication device, or be programmable to perform specific functions within a SNET group/sub-group.

As may be used herein, the terms "substantially" and "approximately" provides an industry-accepted tolerance for its corresponding term and/or relativity between items. Such an industry-accepted tolerance ranges from less than one percent to fifty percent and corresponds to, but is not limited to, component values, integrated circuit process variations, temperature variations, rise and fall times, and/or thermal noise. Such relativity between items ranges from a difference of a few percent to magnitude differences. As may also be used herein, the term(s) "operably coupled to", "coupled to", and/or "coupling" includes direct coupling between items and/or indirect coupling between items via an intervening item (e.g., an item includes, but is not limited to, a component, an element, a circuit, and/or a module) where, for indirect coupling, the intervening item does not modify the information of a signal but may adjust its current level, voltage level, and/or power level. As may further be used herein, inferred coupling (i.e., where one element is coupled to another element by inference) includes direct and indirect coupling between two items in the same manner as "coupled to". As may even further be used herein, the term "operable to" or "operably coupled to" indicates that an item includes one or more of power connections, input(s), output(s), etc., to perform, when activated, one or more its corresponding functions and may further include inferred coupling to one or more other items. As may still further be used herein, the term "associated with", includes direct and/or indirect coupling of separate items and/or one item being embedded within another item. As may be used herein, the term "compares favorably", indicates that a comparison between two or more items, signals, etc., provides a desired relationship. For example, when the desired relationship is that signal 1 has a greater magnitude than signal 2, a favorable comparison may be achieved when the magnitude of signal 1 is greater than that of signal 2 or when the magnitude of signal 2 is less than that of signal 1.

As may also be used herein, the terms "processing module", "module", "processing circuit", and/or "processing unit" may be a single processing device or a plurality of processing devices. Such a processing device may be a microprocessor, micro-controller, digital signal processor, microcomputer, central processing unit, field programmable gate array, programmable logic device, state machine, logic circuitry, analog circuitry, digital circuitry, and/or any device that manipulates signals (analog and/or digital) based on hard coding of the circuitry and/or operational instructions. The processing module, module, processing circuit, and/or processing unit may have an associated memory and/or an integrated memory element, which may be a single memory device, a plurality of memory devices, and/or embedded circuitry of the processing module, module, processing circuit, and/or processing unit. Such a memory device may be a read-only memory, random access memory, volatile memory, non-volatile memory, static memory, dynamic memory, flash memory, cache memory, and/or any device that stores digital information. Note that if the processing module, module, processing circuit, and/or processing unit includes more than one processing device, the processing devices may be centrally located (e.g., directly coupled together via a wired and/or wireless bus structure) or may be distributedly located (e.g., cloud computing via indirect coupling via a local area network and/or a wide area network). Further note that if the processing module, module, processing circuit, and/or processing unit implements one or more of its functions via a state machine, analog circuitry, digital circuitry, and/or logic circuitry, the memory and/or memory element storing the corresponding operational instructions may be embedded within, or external to, the circuitry comprising the state machine, analog circuitry, digital circuitry, and/or logic circuitry. Still further note that, the memory element may store, and the processing module, module, processing circuit, and/or processing unit executes, hard coded and/or operational instructions corresponding to at least some of the steps and/or functions illustrated in one or more of the Figures. Such a memory device or memory element can be included in an article of manufacture.

The present invention has been described above with the aid of method steps illustrating the performance of specified functions and relationships thereof. The boundaries and sequence of these functional building blocks and method steps have been arbitrarily defined herein for convenience of description. Alternate boundaries and sequences can be defined so long as the specified functions and relationships are appropriately performed. Any such alternate boundaries or sequences are thus within the scope and spirit of the claimed invention. Further, the boundaries of these functional building blocks have been arbitrarily defined for convenience of description. Alternate boundaries could be defined as long as the certain significant functions are appropriately performed. Similarly, flow diagram blocks may also have been arbitrarily defined herein to illustrate certain significant functionality. To the extent used, the flow diagram block boundaries and sequence could have been defined otherwise and still perform the certain significant functionality. Such alternate definitions of both functional building blocks and flow diagram blocks and sequences are thus within the scope and spirit of the claimed invention. One of average skill in the art will also recognize that the functional building blocks, and other illustrative blocks, modules and components herein, can be implemented as illustrated or by discrete components, application specific integrated circuits, processors executing appropriate software and the like or any combination thereof.

The present invention may have also been described, at least in part, in terms of one or more embodiments. An embodiment of the present invention is used herein to illustrate the present invention, an aspect thereof, a feature thereof, a concept thereof, and/or an example thereof. A physical embodiment of an apparatus, an article of manufacture, a machine, and/or of a process that embodies the present invention may include one or more of the aspects, features, concepts, examples, etc. described with reference to one or more of the embodiments discussed herein. Further, from figure to figure, the embodiments may incorporate the same or similarly named functions, steps, modules, etc. that may use the same or different reference numbers and, as such, the functions, steps, modules, etc. may be the same or similar functions, steps, modules, etc. or different ones.

Unless specifically stated to the contra, signals to, from, and/or between elements in a figure of any of the figures presented herein may be analog or digital, continuous time or discrete time, and single-ended or differential. For instance, if a signal path is shown as a single-ended path, it also represents a differential signal path. Similarly, if a signal path is shown as a differential path, it also represents a single-ended signal path. While one or more particular architectures are described herein, other architectures can likewise be implemented that use one or more data buses not expressly shown, direct connectivity between elements, and/or indirect coupling between other elements as recognized by one of average skill in the art.

The term "module" is used in the description of the various embodiments of the present invention. A module includes a functional block that is implemented via hardware to perform one or module functions such as the processing of one or more input signals to produce one or more output signals. The hardware that implements the module may itself operate in conjunction software, and/or firmware. As used herein, a module may contain one or more sub-modules that themselves are modules.

While particular combinations of various functions and features of the present invention have been expressly described herein, other combinations of these features and functions are likewise possible. The present invention is not limited by the particular examples disclosed herein and expressly incorporates these other combinations.

What is claimed is:

1. A social networking system that supports interactions with at least a first human member and a second human member, the social networking system comprising:
   a processing system operable to support creation of a first social networking group and a second social networking group, the first social networking group having first group capabilities, and the second social networking group having membership which includes the first human member and the second human member;
   the processing system being operable to also support a first docking process, the first docking process involving associating the first social networking group with the second social networking group so as to provide the first group capabilities to the membership of the second social networking group; and
   the processing system being operable to deliver data to the membership of the second social networking group to support presentation of the first group capabilities.

2. The social networking system of claim 1, the processing system alters an association of the first social networking group with the second social networking group in response to an input.

3. The social networking system of claim 1, the processing system being operable to deliver data to the membership of the second social networking group to support presentation of a representative view of the first group capabilities, the representative view enables the membership to access the first group capabilities.

4. The social networking system of claim 3, wherein:
   the first social networking group comprises a first plurality of social networking groups;
   the first group capabilities comprise capabilities of at least one of the first plurality of social networking groups; and
   the representative view includes a view of the first group capabilities independent of a view of the first plurality of social networking groups.

5. The social networking system of claim 3, the processing system being operable to deliver data to the membership of the second social networking group to support presentation of a first representative view of the first group capabilities to at least the first member of the second social networking group and a second representative view of the first group capabilities to at least the second member of the second social networking group, the first representative view is distinct from the second representative view.

6. The social networking system of claim 1, wherein the second social networking group is a guest social networking group, and the first docking process is an ad hoc docking process that includes associating a guest member with the guest social networking group and associating the guest social networking group with the first social networking group.

7. The social networking system of claim 1, comprising:
   the processing system operable to establish at least one docking specification, the at least one docking specification includes conditions under which the first social networking group may be associated with the second social networking group;
   the processing system being operable to manage access by the membership of the second social networking group to the first group capabilities based one the at least one docking specification; and
   the processing system being operable to alter an association of the member social networking group with the associated social networking group as dictated by the at least one docking specification.

8. The social networking system of claim 7, wherein:
the processing system is operable to associate the second social networking group with a third-party social networking group,
the processing system is operable to manage access by a member of the third-party social networking group to at least one of information included in the second social networking group and the first group capabilities based upon at least one docking specification.

9. A device supporting a user that interacts with a social network, the device comprising:
an interface configured to communicatively couple with a first social networking group providing first group capabilities; and
processing circuitry interoperable with the interface to:
interact with the social network to dock the first social networking group to a second social networking group providing second group capabilities, wherein docking the first social networking group to the second social networking group includes associating the first social networking group with the second social networking group so as to make the second group capabilities available to members of the second social networking group.

10. The device of claim 9, the processing circuitry interoperable with the interface to:
send a group to group docking request, wherein the group to group docking requests includes a request to dock the device to a first social networking group, and
access a capability of the second social networking group.

11. The device of claim 9, the second social networking group includes a plurality of social networking groups, the second group capabilities including a capability of at least one of the plurality of social networking groups.

12. The device of claim 11, the processing circuitry interoperable with the interface to:
display, on a user interface, a representative view of the second social networking group with which the first social networking group is associated, the representative view includes a representation of a capability of the second social networking group independent of capabilities associated with others of the plurality of social networking groups; and
access the capability of the second social networking group based upon a user input, the user input is determined based upon a user interaction with the representative view via the user interface.

13. The device of Claim 9, the processing circuitry interoperable with the interface to:
associate a third-party social networking group with the first social networking group, via a docking process, such that a member of the third-party social networking group has access to at least some information associated with the first social networking group; and
manage access to the first social networking group by the member of the third-party social networking group in response to an input.

14. The device of claim 9, the processing circuitry interoperable with the interface to, in response to receiving an input, interact with the social network to disassociate the first social networking group with the second social networking group.

15. The device of claim 9, the processing circuitry interoperable with the interface to:
interact with the social network, via a docking process, to associate the first social networking group with a second social networking group based upon a geographic proximity of the device to a geographic location associated with the second social networking group; and
in response to determining that the geographic proximity of the device to a geographic location associated with the second social networking group exceeds a threshold, interact with the social network to disassociate the first social networking group with the second social networking group.

16. A method performed by a social networking system, the method comprising:
maintaining a first social networking group having a first group capabilities;
maintaining a second social networking group to support a first human member and a second human member via a first device and a second device respectively; and
responding to a group to group docking request received by associating the first social networking group with the second social networking group so as to make the first group capabilities available to the second social networking group, the group to group docking request originating from an interaction with the first device.

17. The method of claim 16, the group to group docking request is a request to associate the first social networking group with the second social network so as to provide at least one of the first device and the second device with at least some of the first group capabilities.

18. The method of claim 16, comprising:
responding to the group to group docking request by providing both the first device and the second device access to the first group capabilities via a representative view, the first group capabilities are provided by at least one of a plurality of social networking groups, and the representative view includes a representation of the first group capabilities independent of the at least one of the plurality of social networking groups.

19. The method of claim 16, comprising:
providing the second device a limited access to the first group capabilities based on a docking specification originating from an interaction with the first device.

20. The method of claim 18, the first group capabilities include at least one of a gaming capabilities and access to a gambling device.

* * * * *